United States Patent [19]

Bölkow et al.

[11] Patent Number: 4,699,508
[45] Date of Patent: Oct. 13, 1987

[54] METHOD OF MEASURING THE DISTANCE OF A TARGET AND APPARATUS FOR ITS PERFORMANCE

[75] Inventors: Ludwig Bölkow, Grünwald; Walter Mehnert, Ottobrunn; Hoiko Chaborski, Munich, all of Fed. Rep. of Germany

[73] Assignee: MTC Messtechnik und Optelektronik AG, Neuchatel, Switzerland

[21] Appl. No.: 885,335

[22] Filed: Jul. 11, 1986

Related U.S. Application Data

[63] Continuation of Ser. No. 745,824, Jun. 18, 1985, abandoned, which is a continuation of Ser. No. 386,058, Jun. 7, 1982, abandoned.

[30] Foreign Application Priority Data

Jun. 9, 1981 [DE] Fed. Rep. of Germany ....... 3122806
May 24, 1982 [DE] Fed. Rep. of Germany ....... 3219423

[51] Int. Cl.$^4$ .............................................. G01C 3/08
[52] U.S. Cl. ........................................ 356/5; 342/135; 368/120
[58] Field of Search .............. 356/5; 368/120; 343/13, 343/12; 342/135

[56] References Cited

U.S. PATENT DOCUMENTS

| | | | |
|---|---|---|---|
| 3,508,828 | 4/1970 | Froome et al. | 356/5 |
| 3,619,058 | 11/1971 | Hewlett et al. | 356/5 |
| 3,652,161 | 3/1972 | Ross | 343/14 |
| 3,813,165 | 5/1974 | Hines et al. | 356/5 |
| 4,182,570 | 1/1980 | Courrier et al. | 356/5 |
| 4,403,857 | 9/1983 | Holscher | 356/5 |

*Primary Examiner*—Stephen C. Buczinski
*Attorney, Agent, or Firm*—Sughrue, Mion, Zinn, Macpeak, and Seas

[57] ABSTRACT

The distance of a target object is determined from the time of travel of a measuring light pulse which is emitted by a transmitter toward the target object, reflected thereby and received by a receiver. In timed relation with the instant of generation of the measuring light pulse, a start signal for beginning a measuring signal transit time measurement is generated, and, on receipt of the reflected measuring light pulse, a stop signal is generated for terminating this time measurement. A completely independent reference light pulse is generated and forwarded along a reference light path establishing a predetermined time of travel from the transmitter to the receiver, and the respective reference signal transit time is measured which contains the same undesirable additional time spans contained in the measured transit time of the measuring signal. The reference signal transit time measurement value is subtracted from the measuring signal transit time value to eliminate the additional time spans and to obtain a high precision measurement value difference to which the predetermined time of travel of the reference light pulse is added to obtain the genuine time of travel of the measuring light pulse.

43 Claims, 6 Drawing Figures

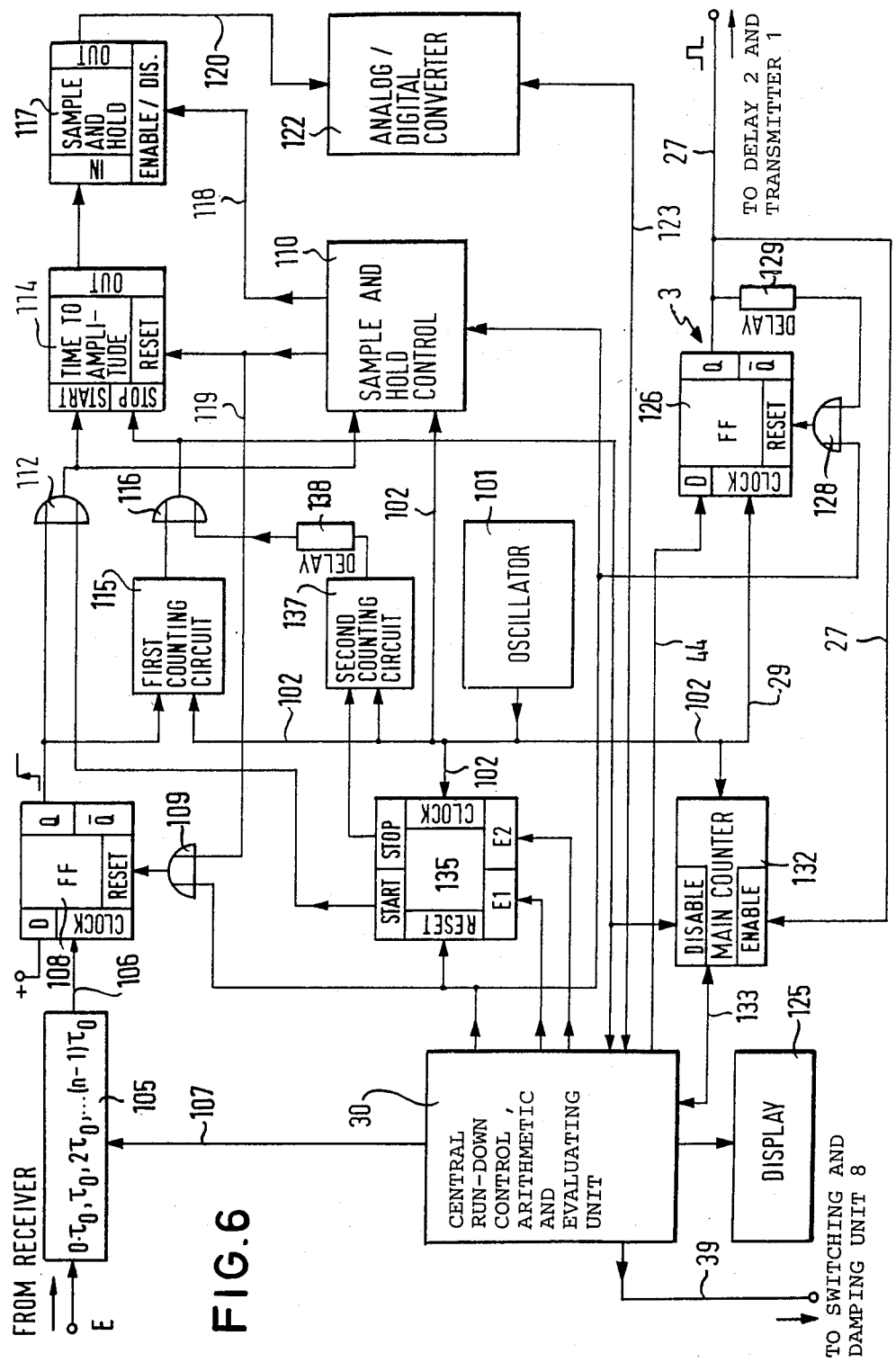

METHOD OF MEASURING THE DISTANCE OF A TARGET AND APPARATUS FOR ITS PERFORMANCE

REFERENCE TO PRIOR APPLICATION

This is a continuation of application Ser. No. 745,824 filed June 18, 1985 which is a continuation of application Ser. No. 386,058 filed June 7, 1982, both abandoned.

FIELD OF THE INVENTION

The invention relates to a distance measurement method measuring the distance of a target as a function of the time of travel of a measuring light pulse from a transmitter to the target and from the target to a receiver.

BACKGROUND OF THE INVENTION

In distance measuring methods measuring the time of travel of a measuring light pulse, it is difficult to correlate exactly in time the instant at which the time measurement is started with the instant, at which the measuring light pulse is emitted and, after its reflection at the target object, to correlate exactly in time the instant at which the time measurement is stopped, with the instant at which the measuring light pulse is received. Such exact correlation in time, however, is necessary to obtain a time measurement value, which, with great accuracy, corresponds to the time of travel of the measuring light pulse and thus makes possible an exact distance determination.

Particularly when targets within a great distance measurement range of, for example, 0 to 100 kilometers and more are to be measured at an accuracy of up to ±1 millimeter, extra-ordinarily great difficulties result, since especially for short distance targets, the delay and signal processing times which arise at the transmitter side between the trigger signal triggering the transmitter to generate a measuring light pulse and the actual emission of the light pulse as well as on the receiver side between the arrival of the reflected measuring light pulse at the receiver, and the generation of the associated stop signal lie in the same order of magnitude as or even exceed the actual "genuine" time of travel of the measuring light pulse.

If no appropriate measures are taken these delay and signal processing times fluctuate due to temperature changes and drift phenomena dependent on aging. These changes of delay and signal processing times can have such a strong effect on the measurement result that it becomes impossible to attain the aforementioned measurement accuracy.

The problem of establishing on the receiver side an exact correlation in time between the instant of reception of the reflected measuring light pulse and the instant of generation of the stop signal for the time measurement can be regarded as solved in principle by the circuit arrangement disclosed in DE-OS No. 26 34 627.

However, it is more difficult on the transmitter side to establish an exact correlation between the instant at which the transmitter responds to the trigger signal and a start signal since this response time or delay can be subject to strong changes. Therefore the trigger signal is not readily usable as a start signal for the time measurement.

To overcome this problem, it is for example known from the U.S. Pat. No. 3,652,161 to branch off a part of each measuring light pulse emitted by the transmitter, for example by means of a partially permeable mirror, and to use this branched off part as a reference light pulse which, via a reference light path, is forwarded to a photo-detector translating it into a start signal, correlated with the instant of transmission of the measuring light pulse. Two different receivers are used, the one receiving the measuring light pulses and the other one receiving the reference light pulses. If no further measures are taken, difficulties result from the different response behaviour and the different fluctuation phenomena of the signal processing times of the two receivers and of the two receiving channels connected thereto. If, on the other hand, measuring light pulse and reference light pulse are forwarded to one and the same receiver, the measurement of small distances becomes difficult, since the single receiving channel as well as the time measuring device can process without difficulties only signals which have a certain minimum spacing. Although it is possible with appropriate circuit effort to build time measuring device which can measure the time spacing of signals following one another practically as closely as desired, the amplifier and signal generating circuit of the receiving channel have a certain recovery time, i.e. a certain minimum time must elapse after the reception of a light pulse before a new pulse can be processed unobjectionably. This causes a lower limit for the smallest measurable distances, which limit can be made very small but can not be brought to zero.

An objective of the invention is to provide a method and an apparatus of the foregoing kind which is simple, reliable and operates with great accuracy over a wide measurement range, the lower limit of which is practically zero.

SUMMARY OF THE INVENTION

The invention bases on the recognition that, for the attainment of a high measurement accuracy, it is neither necessary to produce an exactly known correlation in time, reproducible exactly over long periods, between the start signal for the time measuring device and the instant of emission of the measuring light pulse nor between the instant of reception of the reflected measuring light pulse and the stop signal for the time measuring device. Rather, a completely different concept is used according to the invention, in which it is no longer attempted to detect the "pure" time of travel of a measuring light pulse, i.e. the time between the actual generation of the measuring light pulse at the light emitting surface of the transmitter and the actual receipt of the measuring light pulse at the photo-sensitive surface of the receiver. Instead thereof, according to the method of the invention at least two light pulses are separately generated one after the other, the one for use as measuring light pulse being forwarded from the transmitter to the target object and from there back to the receiver, and the other for use as reference light pulse being forwarded via a reference light path which extends inside the instrument from the transmitter to the receiver and establishes a predetermined time of travel. For each of these at least two independent light pulses a complete signal transit time measurement is performed and the resulting at least two measurement values are used to determine one single target distance value.

In both cases, the signal, the transit time of which is measured, is present for certain parts of this transit time in electrical form and for other parts of this transit time in the form of a light pulse. In other words, the measuring signal transmit time measurement value $T_M$ obtained for the at least one measuring light pulse comprises three components: A first time span $t_1$ elapsing between the instant, at which the measuring signal transit time measurement for the measuring light pulse is started, and the instant, at which the measuring light pulse is actually generated by the transmitter, (this time span $t_1$ has a negative sign when the last named instant lies before the first named); furthermore the actual time of travel $t_M$ which the measuring light pulse needs for traversing the measurement route, and a third time span $t_3$ elapsing between the arrival of the measuring light pulse at the receiver and the termination of the measuring signal transit time measurement. This can be expressed by the following equation:

$$T_M = t_1 + t_M + t_3, \quad (1)$$

wherein $t_M$ is the actually interesting value since it is proportional to the distance to be measured.

According to the invention, it is not required for the attainment of a high measurement accuracy exactly to know the time spans $t_1$ and $t_3$ and/or to stabilize them in particular manner against fluctuations or drift phenomena. It suffices rather to take care that both these time spans $t'_1$ and $t'_3$ likewise enter into the signal transit time measurement value $T_R$ of the reference light pulse so that for the reference light pulse, there applies $$T_R = t'_1 + t_R + t'_3 \quad (2)$$

$t'_1$ being the time span between the instant at which the respective reference signal transit time measurement is started and the instant at which the reference light pulse is actually generated, $t_R$ being the time of travel of the reference light pulse through the reference light path, and $t'_3$ being the time span between the receipt of the reference light pulse and the actual termination of the time measurement. Additionally, both signal transit time measurements have to be performed within such a short period of time that the differences $t_1 - t'_1$ and $t_3 - t'_3$ due to fluctuations become negligibly small or can be appropriately reduced through a simple interpolation or mean value formation from several measurement values for $T_M$ and $T_R$.

In the first case, i.e. when the measurement of the measuring signal transit time $T_M$ over the measurement route and the measurement of the reference signal transit time $T_R$ over the reference route can be performed within a very short period of time, for example within 50 microseconds to 100 microseconds and/or when no extremely high demands are made on the measurement accuracy, $t_1$ can be considered to be exactly equal to $t'_1$ and $t_3$ can be considered to be exactly equal to $t'_3$:$t_1 = t'_1$ and $t_3 = t'_3$. Then the above equation (2) can be solved for $t_1 + t_2$ and inserted into equation (1), from which one obtains, through resolution of the thus obtained equation, the magnitude $t_M$:

$$t_M = T_M - (T_R - t_R); \quad (3)$$

$t_M$ thus results through a simple arithmetic operation from two very accurately measurable time distances $T_M$ and $T_R$ and an instrument constant $t_R$.

In all the cases, in which the assumption of $t_1 = t'_1$ and $t_3 = t'_3$ is not permissible, because either switching-over is done more slowly and/or an extremely high measurement accuracy is aimed at, according to the invention each measuring signal transit time measurement over the measurement route can be included between two reference signal transit time measurements over the reference route. For both the latter signal transit time measurements, one then obtains $$T_{R1} = t_{11} + t_R + t_{31} \quad (4)$$

and $$T_{R2} + t_{12} + t_R + t_{32} \quad (5)$$

wherein the second suffices are to indicate that $t_1$ and $t_3$ and thereby also $T_{R1}$ and $T_{R2}$ have changed by reason of fluctuation phenomena in the period of time, which lies between both these measurements and into which also falls the measurement of the measuring signal transit time $T_M$ over the measurement route.

Since it is always possible to determine both the reference signal transit time values $T_{R1}$ and $T_{R2}$ so quickly one behind the other that meantime changes can be regarded as linear to a sufficient approximation, a simple interpolation suffices to be able to perform a usable correction of the measuring signal transit time value $T_M$ obtained in this time interval. If one assumes that the measurement of $T_M$ takes place exactly in the time centre between both the measurements of $T_{R1}$ or $T_{R2}$, then there applies $$t_1 + t_3 = \frac{(T_{R1} - t_R) + (T_{R2} - t_R)}{2} = \frac{T_{R1} + T_{R2}}{2} - t_R \quad (6)$$

and in analogy to equation (3), one obtains $$t_M = T_M - \left( \frac{T_{R1} + T_{R2}}{2} - t_R \right) \quad (7)$$

$T_M$, $T_{R1}$ and $T_{R2}$ again being measurement values of high accuracy and $t_R$ being the constant predetermined time of travel established by the reference light path.

A further possibility according to the invention for the attainment of a very high measurement accuracy with simultaneous lowering of the speed at which switching-over is done between measuring signal transit time measurements over the measurement route and reference signal transit time measurements over the reference route, consists in performing several measuring signal measurements over the measurement route and several reference signal measurements over the reference route alternately, i.e. intercalated one among the other, and to take the mean values from each group of the thus obtained measurement values $T_M$ or $T_R$ and to insert these mean values into the above equations (3) and (7), respectively. In this case however, it is presupposed that all changes are either sufficiently slow or linear.

Furthermore it is necessary that $t_R$ can indeed be considered as an instrument constant invariable over long spaces of time. This means that the length of the reference light path inside the measuring apparatus must be invariable. This can be attained most simply by directing the reference light pulses from the light path change-over switch substantially by way of a light fibre conductor to the receiver; if necessary an optical damper can be arranged in this light path. Although the length of such a light fibre conductor is dependent on temperature, it is possible continuously to measure the temperature in the interior of the instrument and to perform a correction of $t_R$ with the aid of this measurement value.

Preferably, the length of the light fibre conductor substantially forming the reference light path is however chosen to be so short that its change in length even for great temperature fluctuations lies below the measurement accuracy aimed at.

If one uses the mean values of several signal transit time measurements over the measurement and the reference route, respectively, for the calculation of a single distance measurement value, it is advantageous for obtaining a very high measurement accuracy to dispose in time the trigger signals for the transmitter so that the alternating measuring light pulses and reference light pulses arrive at the receiver as exactly periodically as possible. This is obtained by generating a first measuring light pulse, which serves for an approximate distance determination and by using the corresponding signal transit time measurement value to shift the instants at which trigger signals for measuring light pulses are generated relative to the instants at which trigger signals for the reference light pulses are generated so that measuring light pulses and reference light pulses arrive periodically at the receiver in spite of the different lengths of the measuring light path and the reference light path.

This periodical operation of the receiver side of a distance measuring instrument is particularly advantageous for the reason that the analog circuits, which further process the light pulses in the receiving channel, like all analog circuits have the property that the magnitude of the error which is superimposed by them on the measurement signal to be processed depends on the time spacing between two successive signal processing operations of like kind. Through the periodicity of the drive, it is ensured according to the invention that these errors enter with the same magnitude into the signal transit time measurement values of the measuring light pulses as well as of the associated reference light pulses and thus cancel out in a subtracting step which is performed to obtain a distance value.

Beyond that, a time base signal generally finds use in the time measuring device of a distance measuring instument under discussion here, which time base signal comes into use at the most diverse places and is therefore unavoidably present on practically all conductors as an albeit very small, periodically fluctuating interference singal.

If one now operates the arrangement not at a desired periodicity, but at a sequence frequency, which amounts to an integral multiple of the frequency of the time base signal, then also the interference voltages caused by the time base signal enter into the analog signals at the same amplitude and therefore again drop out during the succeeding subtraction.

As already mentioned, the method according to the invention requires that the times $t_1$ and $t_3$, in which the respective signal is present in electrical form and which contain the response times required for transforming the electrical signal into an optical signal as well as the optical signal into an electrical form, enter in like manner into the signal transit time measurement values $T_M$ or $T_R$ for measuring and reference light pulses belonging together.

To meet this condition, two suitable ways are provided according to the invention in dependence on the kind of the respectively used transmitter.

In the one kind of transmitter, the typical representative of which is a Laser diode, the reaction time, which passes between the feeding of a trigger signal to the transmitter and the generation of a light pulse, is reproducible with sufficiently good accuracy at least for the short periods of time, which are needed for the performance of the signal transit time measurements contributing to one distance measurement value, when one takes care of a suitable, constant supply voltage of the Laser diode.

This reproduceability of the reaction time of the transmitter makes it possible to use the trigger signal generated by the trigger generator as start signal or as start-preparing signal for the time measurement circuit for the measuring light pulses as well as also for the reference light pulses, which trigger signal is conducted to the transmitter preferably later by a predetermined delay $\tau$ than to the time measuring circuit.

In this case, in which the time measurement is started before the generation of the light pulse, the time span $t_1$ appearing in the above equations is positive and comprises substantially the additional delay time $\tau$ and the responsive delay of the transmitter.

Both delays are completely uncritical in respect of their medium term constancy and long term stability, since it can be presumed that during the short period of time needed for the performance of the measurements for a distance measurement value, both change either not at all or at most linearly, wherein the latter can be taken into consideration by an appropriate interpolation.

A substantial advantage of the additional, electronically generated delay $\tau$ is that it can be chosen to be so great that the spacing between start signal and stop signal even in the case of the measurement of very small distances is always sufficiently great in order also to be able to be measured readily with a simply constructed time measuring circuit.

A further advantage of the delay member provided according to the invention is to be seen in that the start of each signal transit time measurement, which makes necessary to detect exactly in time an edge of a generally pulse-shaped signal, takes place in a period of time, in which the transmitter has not yet received the trigger signal. The transmitter reacts to this trigger signal by the generation of a very rapid and comparatively great current pulse through the transmitting diode so that very strong interference signals are generated, which would make it extraordinarily difficult exactly in time to detect a start signal, falling into this space of time, for the signal transit time measurement.

If each signal transit time measurement is started by the trigger signal which is not correlated with the time base signal, it is necessary to perform for each signal transit time measurement a complete three-part time measurement. In this case it is useful to measure the time distance, which the trigger or start signal has from a defined subsequent pulse edge of the time base signal by an analog measuring circuit, to obtain a first precision time measurement value, and to measure by means of the same analog measuring circuit the time distance which the respective stop signal generated after the arrival of the light pulse at the receiver for stopping the time measurement has from a defined second subsequent pulse edge of the time base signal, to obtain a second precision time measurement value, and to count as coarse measurement value the pulses of the time base signal which occur between both the just mentioned pulse edges. The signal transit time can then be calculated from these three measurement values by adding the first precision time measurement value to the coarse measurement value and by subtracting the second precision time measurement value from the thereby obtained sum. Consequently, alltogether four precision measurements value formations and two coarse measurement value formations are required for obtaining the signal transit time difference of a measurement light pulse and a reference light pulse.

However, in this embodiment an increased effort in terms of measurement technique is required and a disadvantage results from the fact that the analog measuring device and the entire measuring channel can not be operated at constant frequency, since the times of travel of the measuring light pulses will normally be different from those of the reference light pulses. This aperiodic operation of the measuring channel can however, as already mentioned, have the consequence of worsening the accuracy of the thus obtained measurement results.

To avoid these problems, it is advantageous to generate the trigger signals in synchronism with the time base signal. In this case, the trigger signal no longer serves as actual start signal of the signal transit time measurement, but only as preparatory signal for an in any case required coarse time measurement, which takes place through counting of the pulse edges of the time base signal and begins with a pulse edge of the time base signal, which stands in defined correlation with the trigger signal, for example with the fifth edge following the trigger signal. With the omission of the above described respective first precision measurement value formation for a distance measurement value, it thus suffices to determine only the coarse measurement value for the transit time of at least one measuring light pulse and, in case this can not be considered as instrument constant, to determine the coarse measurement value for the transit time of a reference light pulse as well as the "second" precision measurement values for the transit times of both light pulses in order to obtain therefrom the sought transit time difference with the accuracy, with which the period of the time base signal is constant and known. Through the omission of the first precision measurement value formations, it is possible through an appropriate choice of the instants, at which the trigger signals are generated, to obtain the light pulses in strict periodicity at the receiver in the above described manner.

An other kind of transmitter, the typical representative of which is a gas or solid-state Laser, thereagainst has the property that its reaction time can fluctuate to an appreciable degree even when the light pulses concerned are generated very rapidly one behind the other. Consequently a start of the transit time measurement by the trigger signal would lead to intolerable measurement errors. Therefore, within the scope of the invention, the start of the signal transit time measurement for transmitters of that kind is effected for each measuring light pulse as well as also for each reference light pulse by means of the output signals of an auxiliary receiver, to which a split off part of the respective light pulse is forwarded via an auxiliary light path inside the instrument. On receipt of each split off light pulse part the auxiliary receiver generates an output signal, which is used as start signal for the respective signal transit time measurement.

In this case, in which the signal transit time measurement is started after the generation of the respective light pulse, the time span $t_1$ is negative and contains the transit time of the split off light pulse part from the transmitter to the auxiliary receiver as well as the reaction time of the auxiliary receiver. These parts of $t_1$ are however again constant or at least variable linearly for the short periods of time to be considered so that the above equations can again find use. It is decisive that here, too, all possible delays enter in like manner at least into the mean values of the the signal transit time of measurement light pulses and reference light pulses and therefore are eliminated by the corresponding subtraction operation.

A synchronisation between the trigger signals and the time base signal of the time measuring circuit is here not sensible because of the fluctating reaction behaviour of the transmitter. For this reason, a three-part time measurement resulting in two precision time measurement values and one coarse measurement value must be performed for each signal transit time measurement for a measuring light pulse, whilst only the precision time measurement values need be determined for the reference light pulses, when the respective coarse time measurement value can be considered as instrument constant. Altogether, a somewhat smaller absolute measurement accuracy results in this case than for the transmitters of the first kind, which is however more than compensated for in respect of the relative accuracy by the substantially higher power and thereby appreciable enlarged maximum range of these transmitters of the second kind.

In order also to be able to measure distances as short as desired and in particular to be able to use a short reference light path, in the case of a version of a distance measuring instrument according to the invention operating with an auxiliary receiver, a time meausring device is preferably used, which in respect of the precision time measurement value formation processes the start signal and the stop signal for the signal transit time measurement each in a respective analog measuring channel. A time measuring device of that kind is described for example in the DE-OS No. 28 42 450.

This affords the advantage that the trigger pulses can again be so controlled in time that the light pulses arrive periodically at each of the receivers so that the errors introduced by the analog signal processing channels are kept small. Although the fluctuating reaction behaviour of the transmitter does not permit a highly accurate periodicity, the deviations in the case of the anyway limited maximum light pulse sequence frequency of transmitters of that kind remain in the range of a few tenths of a percent or less so that a substantial improvement in the measurement accuracy can be attained for the reasons already mentioned above through the timing control of the trigger signals according to the invention.

BRIEF DESCRIPTION OF THE DRAWING

The invention is described in the following with the aid of examples of embodiment with reference to the drawing; in this, there show.

DESCRIPTION OF PREFERRED EMBODIMENTS OF THE INVENTION

Figure 1:
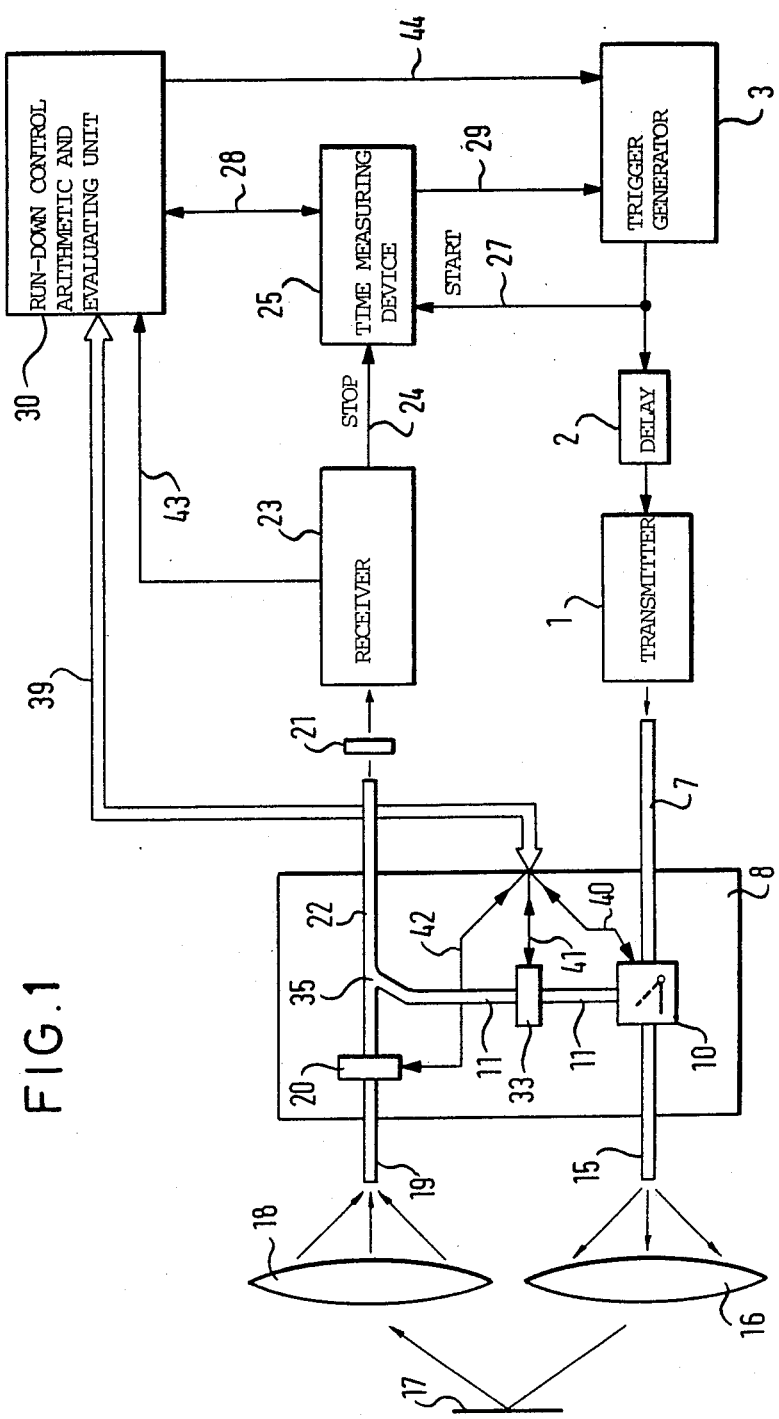
FIG. 1 a schematic block diagram of a first embodiment of a distance measuring apparatus comprising a light path change-over switch, wherein the signal transit time measurements are started by means of trigger signals from a trigger generator, FIG. 2 a schematic block diagram of a second embodiment, also comprising a light path change-over switch and a beam splitter for forwarding a part of each light pulse to an auxiliary receiver the output signals of which are used as start signals, FIG. 3 a schematic block diagram of a third embodiment comprising a main transmitter for generating measuring light pulses, an auxiliary transmitter for generating reference light pulses and two beam splitters for forwarding a part of each light pulse to an auxiliary receiver the output signals of which are used as start signals, FIG. 4 a schematic block diagram of a fourth embodiment comprising a main transmitter and an auxilary transmitter for generating individual light pulses which alternately are used as measuring light pulses, first auxiliary light pulses, reference light pulses and second auxiliary light pulses, the signal transit time measurements for all four types of light pulses being started by respective trigger signals and being stopped by the output signals of a main receiver and an auxiliary receiver, FIG. 5 a schematic block diagram of a fifth embodiment in which also alternately four different types of light pulses are generated, the respective signal transit time measurements, however, being started as well as stopped by output signals of a main receiver and of an auxiliary receiver, and FIG. 6 a schematic block diagram of a time measuring device which can especially be used in connection with the embodiment shown in FIG. 1.

The embodiment, represented in FIG. 1, of a distance measuring instrument, according to the invention and operating on the principle of the signal transit time measurement, comprises a transmitter 1, which comprises a Laser diode and a circuit arrangement, which supplies the Laser diode with energy and consists substantially of a "slowly" chargeable energy store in the form of a capacitance and a controllable electronic switch which serves to discharge the energy collected in the energy store rapidly through the transmitting diode for the generation of a Laser light pulse.

The drive of this switch takes place through a trigger generator 3, the output signal of which at the same time serves as start or start-preparing signal for the respective signal transit time measurement since the response behaviour of the Laser diode is well reproducible at least within short periods of time. Connected between the trigger generaor 3 and the transmitter 1 is a delay member 2, which on the one hand takes care that, even when measuring a very short distance, the stop signal for the transit time measurement has a sufficiently large time spacing from the start signal so that both these signals can be processed readily one after the other by one and the same time measuring channel, and which on the other hand has the effect that the signal transit time measurement is started before that instant and thereby free of interference, in which the transmitter reacts to the trigger signal by the generation of a very rapid and comparatively great current pulse through the transmitting diode, during which very strong interference signals are generated, which would make it extraordinarily difficult exactly in time to detect a start signal for the signal transit time measurement delivered exactly sumultaneously with or shortly after the light pulse generation by the transmitter 1.

The light pulses generated by the transmitter 1 are fed through a transmitter light path 7 to an optical switching and damping unit 8, which contains a light path change-over switch 10, which according to its setting directs a light pulse issuing from the transmitter light path 7 either into a transmitter measurement light path 15 or into a reference light path 11 inside the instrument.

The light path change-over switch 10 can be formed by a mechanically movable mirror device or the like. Also a stationary beam splitter can be used, in each of the two outgoing light paths of which a respective damping member is arranged which is variable between a very high (preperably infinitely high) and a very small damping, wherein both the damping members are then controlled in opposite sense to achive the switch-over function.

The light pulses fed into the transmitter measurement light path 15 by the light path change-over switch 10 in its measurement light setting are conducted further to an optical transmitting system 16, which is illustrated simplified as single lens and emits the light pulses to the target object 17, the distance of which shall be measured.

That part of each light pulse, which is reflected by the target object 17, is fed by an optical receiving system 18, which is likewise illustrated schematically as single lens in FIG. 1, through a receiving measurement light path 19, a variable optical damper 20 contained in the optical switching and damping unit 8 and a receiving light path 22, which contains an interference filter 21, to a receiver 23, which for example as light-electrical transducer comprises a photo-diode with an amplifier and signal generating circuit which is connected therebehind and serves to feed a signal generated by it on the reception of a light pulse as stop signal through a line 24 to a time measuring device 25 in order to terminate the signal transit time measurement performed by this time measuring device for the light pulse concerned. This signal transit time measurement was started previsously, as mentioned above, in dependence on the trigger signal which was delivered by the trigger generator 3 and which is feedable through the line 27 to the time measuring device 25.

For the case that the output signals of the trigger generator 3 shall be synchronised with a time base signal generated in the time measuring device 25, a line 29 is provided, through which appropriate signals can be transmitted from the time measuring device 25 to the trigger generator 3.

The time measurement results obtained by the time measuring device 25 are conducted through lines 28 to a central run-down control, arithmetic and evaluating unit 30, which on the one hand determines the corrected distance measurement values from these transit time measurement values and causes them to be indicated and which on the other hand controls the functional courses in the entire measuring instrument. Preferably, this run-down control, arithmetic and evaluating unit 30 can comprise a microprocessor.

The light pulses fed into the reference light path 11 by the light path change-over switch 10 in its reference light setting pass through an optical damper 33, which in a given case is controllable, and are conducted at a branching point 25 into the part 22 of the receiving light path leading to the receiver 23. The reference light pulses running over this path from the transmitter 1 to the receiver 23 are subject to the same delay and signal processing times at the transmitter side in respect to the trigger signal and at the receiver side up to the generation of the stop signal for the time measuring device 25 as the measurement light pulses, from which they differ substantially only in respect of the length of the light path traversed between the light path change-over switch 10 and the branching point 35. Since the length of this reference light path 11 and thereby also the time required for its traverse, i.e. the time of travel established by it, is very accurately known, the above mentioned delay and signal processing times, which form part of each measuring signal transit time value, can be eliminated by subtracting a reference signal transit time measurement value therefrom.

In principle, the optical switching and damping unit 8 can be built up with any desired known switching and damping devices in the above described manner. A particularly advantageous build-up of such a switching and damping unit 8 is however described in the simultaneously filed German Patent Application No. P 32 19 452.8.

A signal exchange between the optical switching and damping unit 8 and the run-down control, arithmetic and evaluating unit 30 takes place through the line 39, which can be constructed to be multi-core or bidirectional so that data concerning the instantaneous setting of the light path change-over switch 10 can be transmitted through the line 40 to the run-down control, arithmetic and evaluating circuit 30 and command signals adapted to the respective operational state can be delivered by the run-down control, arithmetic and evaluating unit 30 through the lines 41 and 42 to the optical damper 20 or 33.

For the determination of the required damping of the light pulses and for adaptation of the amplitudes of the reference light pulses to that of the associated measurement light pulses, the receiver 23 comprises comparators which transmit their signals through the line 43 to the central run-down control, arithmetic and evaluating unit 30 for further processing.

In this embodiment, the time measuring circuit 25 as well as the receiver 23 can be designed fully single-channelled, i.e. all analog precision time measurements are performed by one and the same analog measuring device, the signal processing times of which inclusive of the fluctuations and drift phenomena cancel out by reason of the subtraction operation between measurement light and reference light signal transit time measurement values obtained rapidly one behind the other. A time measuring device of this kind preferably coming into use here is disclosed in German Patent Application No. P 32 15 847.5 (corresponding to U.S. Pat. No. 4,569,599) and is illustrated together with a central run-down control, arithmetic and evaluating unit 30 and a trigger generator 3 in FIG. 6.

According to FIG. 6 the time measuring device comprises a quartz-controlled oscillator 101 which delivers a time base signal at a frequency of, for example, 15 MegaHertz. This time base signal is forwarded along a line 102 to all circuit parts which shall in any manner generate or transmit signals synchronised with this time base signal.

The stop pulses, generated by the receiver 23 (FIG. 1) upon receipt of measuring light pulses as well as of reference light pulses are each fed through the input E to the time measurement device according to FIG. 6. From there, they get directly to a controllable delay arrangement 105, on the output line 106 of which these individual signals appear, in depencence on a signal delivered by the central run-down control, arithmetic and evaluating unit 30 thorough line 107 to the controllable delay arrangement 105, with a delay $O.\tau_O$, i.e. undelayed, or with a delay which is an integral multiple of the unit delay $\tau_O$.

The output signals of the delay arrangement 105, which, in the following are supposed to be rectangular pulse signals, are used as a trigger signal for D-flip-flop 108 to the clock input of which they are forwarded on line 106. This flip-flop 108 can be reset by the output signal of an OR-gate 109 forwarding either a master resetting pulse delivered by the central run-down control, arithmetic and evaluating unit 30 or a resetting pulse delivered from a sample-and-hold control 110.

Flip-flop 108 is a D-flip-flop the data input of which constantly lies at a positive voltage, i.e. at a logic 1. Therefore, the Q-output of the previously reset flip-flop 108 is set from a logic 0 to a logic 1 by the rising edge of each individual signal supplied on line 106. The rising edge, which is generated in that case at the Q-output of D-flip-flop 108 gets on the one hand through an OR-gate 112 to the start input of a time-to-amplitude converter circuit 114, which thereupon starts with the measurement operation, and to a trigger input of the sample-and-hold control 110 as well as on the other hand to the trigger input of a first counting circuit 115, which at its second input receives the time base signal through line 102 and, after being triggered by the Q-output signal of the flip-flop 108 counts the rising edges of the time base signal and delivers in synchronism with the fourth counted edge an output signal via an OR-gate 116 to the stop input of the time-to-amplitude converter circuit 114, which hereby ceases its measurement operation. That means, that the time-to-amplitude converter circuit 114 measures the time distance between a stop signal generated by the electro-optical receiver 23 upon receipt of a light pulse and a defined subsequent, in this case the fourth subsequent pulse of the time base signal in order to obtain a precision time measurement value for the respective transit time measurement. The output voltage of the time-to-amplitude converter circuit 114, which represents this precision time measurement value is retained until it has been taken over under the control of the sample-and-hold control 110 into a sample-and-hold circuit 117 serving as analog intermediate store. For this purpose, the sample-and-hold circuit 117 is supplied by the control 110 through line 118 with an appropriate control signal.

When this signal transfer is completed, then the sample-and-hold control 110 through line 119 gives off a resetting signal, by which the time-to-amplitude converter circuit 114 and, as already mentioned above, the D-flip-flop 108 are reset into their respective initial state, in which they are ready for the processing of the next individual stop signal coming in through input E.

The analog measurement result present at the output of the sample-and-hold circuit 117 gets through line 120 to an analog-to-digital converter 122, which under the control of the central run-down control, arithmetic and evaluating unit 30 translates it into a digital form and gives this digital value off to the central run-down control, arithmetic and evaluating unit 30 for further processing through bidirectional line 123, on which it also receives its control commands. The central run-down control, arithmetic and evaluating unit 30 processes the measurement results thus received and the calibration measurement values obtained in a similar manner as required and calculates the measurement result actually of interest, which can be displayed by a display unit 125.

The D-flop-flop 126, which is represented in the right lower region of FIG. 6 as being the main part of trigger generator 3 has a D-input to which a logic 1 is supplied at given instants as a command signal from the central run-down control, arithmetic and evaluating unit 30 through line 44.

This D-flip-flop 126 represents the simplest form of a synchronising circuit which, each time an appropriate command signal has been given off through line 44 by the central run-down control, arithmetic and evaluating unit 30 gives off a trigger signal having an exactly defined phase relation to the time base signal for the transmitter 1, illustrated in FIG. 1, and which thus generates in a strictly phase-rigid correlation with the time base signal the individual light pulses, which later, after having travelled through a measuring light path or through a reference light path are received by receiver 23 the corresponding output signals of which appear at the input E. For this purpose, the time base signal of oscillator 101 is supplied to the clock input of D-flip-flop 126 through the appropriate part 29 (see also FIG. 1) of line 102. This has the consequence that the D-flip-flop 126, which was previously reset through an OR-gate 128 either with the aid of the master resetting pulse generated by the central run-down control, arithmetic and evaluating unit 30 or with the aid of the trigger signal appearing at its own Q-output and delayed through the delay member 129 for the attainment of a certain minimum pulse width, it set through the first rising edge of the time base signal following on the command signal supplied through line 44 so that the desired trigger signal for the transmitter appears at the Q-output of flip-flop 126 in synchronism with the time base signal.

The command signals, which are given off by the central run-down control, arithmetic and evaluating unit 30 for the generation of a respective synchronised trigger signal, are so generated that they have sufficiently large time distances. In response to these trigger signals the transmitter generates a first group of n, i.e. for example eight individual light pulses, and then a second group of n, i.e. again eight light pulses. The information whether the light pulses of the first group or the light pulses of the second group are to be used as measuring light pulses or as reference light pulses or vice versa is supplied to the optical switching and damping unit 8 (see FIG. 1) from the central run-down control, arithmetic and evaluating unit 30 along line 39.

It is presupposed that each of the such generated light pulse signals, on the way from the transmitter 1 to the input E needs a certain transit time, the magnitude of which is unknown but the same for each of the n measuring light pulses. Correspondingly each of the so generated n reference light pulse signals, on the way from the transmitter 1 to the input E needs a certain transit time the magnitude of which is generally different from that of the measuring light pulse signals.

Not only the time distances of the delayed individual measuring and reference light pulse signals from a defined succeeding edge of the time base signal but also substantially larger time distances, namely the whole time of travel of the individual measuring and reference light pulse signals, are to be measured. The corresponding measurement values can be obtained with the aid of a main counter 132, which receives the time base signal of the oscillator 101 through line 102 and counts the relevant (i.e. either the rising or the falling) edges thereof. The counting start of the main counter 132 is initiated by the synchronisation flip-flop 126 through line 27. The count result, which represents a coarse time measurement value for the respective transit time measurement, can be transferred from the main counter 132 through bidirectional lines 133 into the central run-down control, arithmetic and evaluating unit, which adds this coarse time measurement value to said precision time measurement value in order to obtain a signal transit time measurement value. The counting operation of the main counter 132 for each individual measuring and reference light pulse signal is terminated by the output signal of the OR-gate 116, which indeed also stops the time-to-amplitude converter circuit 114. Beyond that, this output signal of the OR-gate 116 is conducted to the central run-down control, arithmetic and evaluating unit 30 in order to indicate to this unit that the count result can now be taken over from the main counter 132 on lines 133.

In order that the time-to-amplitude converter circuit 114 can always be calibrated again with the aid of the time base signal, a start-stop control 135 is provided which can perform two different types of calibration measurement according to whether it receives a trigger signal at either its input E1 or its input E2 from the central run-down control, arithmetic and evaluating unit 30.

Being triggered at input E1, it delivers exactly simultaneously at its start output and at its stop output a respective signal, both signals being synchronised with the time base signal supplied through line 102 to the pulse input of the start-stop control 135. The one of these two signals is fed through OR-gate 112 to the start input of the time-to-amplitude converter circuit 114, which thereupon starts to operate, while the other is applied to the trigger input of a second counting circuit 137, which at its pulse input likewise receives the time base signal of oscillator 101. This second counting circuit 137 thereupon counts the following relevant, for example the rising, edges of the time base signal and provides in synchronism with the third of these edges a stop signal which is fed through a delay member 138 to OR-gate 116, from where it gets as stop signal to the time-to-amplitude converter circuit 114, to counter 132 and to the central run-down control, arithmetic and evaluating unit 30. By reason of this triggering through the input E1 of the start-stop control 135, the time-to-amplitude converter circuit 114 thus operates for a space of time which is somewhat longer than three periods of the time base signal and thus delivers a first calibration measurement value suitable for the determination of a straight calibration line, since the period length of the time base signal delivered by the quartz-controlled oscillator 101 is after all known with very great accuracy and constant.

When the central run-down control, arithmetic and evaluating unit 30 applies a trigger signal to the input E2 of the start-stop control 135, then this again at both its outputs generates a start signal and a stop signal, respectively, which however this time are displaced one relative to the other in time by exactly one period length of the time base signal. They are fed in the same manner as described above to the time-to-amplitude converter circuit 114, which for this second kind of calibration measurement operates for a period of time, which is somewhat longer than four period lengths of the time base signal. Thereby, one obtains a second, very exact calibration value which together with the previously described calibration value is suitable for the definition of a straight calibration line, with the aid of which the actual characteristic curve of the time-to-amplitude converter circuit can be approximated.

In cases (see especially FIGS. 2 and 3) in which the trigger signal is not to be synchronised with the time base signal the lower part 29 of line 102 can be omitted and line 44 from central run-down control, arithmetic and evaluating unit 30 can be connected to a set input (not shown in FIG. 6) of flip-flop 126. In these cases two precision time measurement values have to be obtained for each transit time measurement, the first of which represents the time distance between the corresponding start signal, and, for example, the fourth subsequent pulse of the time base signal whereas the second one represents the time distance between the corresponding stop signal and the fourth pulse of the time base signal following thereupon.

The distance measuring instrument illustrated in FIG. 1 operates in the manner that the light path change-over switch 10 periodically changes between measurement light setting and reference light setting. The central run-down control, arithmetic and evaluating unit 30 in time dependence on the switching state of the light path change-over switch 10, on which it obtains data by means of the lines 39 and 40, controls the trigger generator 3 through line 44 so that it causes the transmitter 1 at the right instants in time to generate light pulses which by reason of the respectively instantaneous setting of the light path change-over switch 10 are used either as measurement or as reference light pulses and are forwarded to the receiver 23 with an appropriate damping. When measuring a new target object 17, the correct damping value is at first determined by a series of trial measurements and, as soon as it is fixed, preferably a plurality or series of alternating measuring and reference light pulses is generated so rapidly that neither the distance of the target object nor the signal delay times entering into the measurement values change within this time. From the signal transit time measurement values thus obtained, mean or average values are taken and the sought distance measurement value is calculated therefrom.

Figure 2:
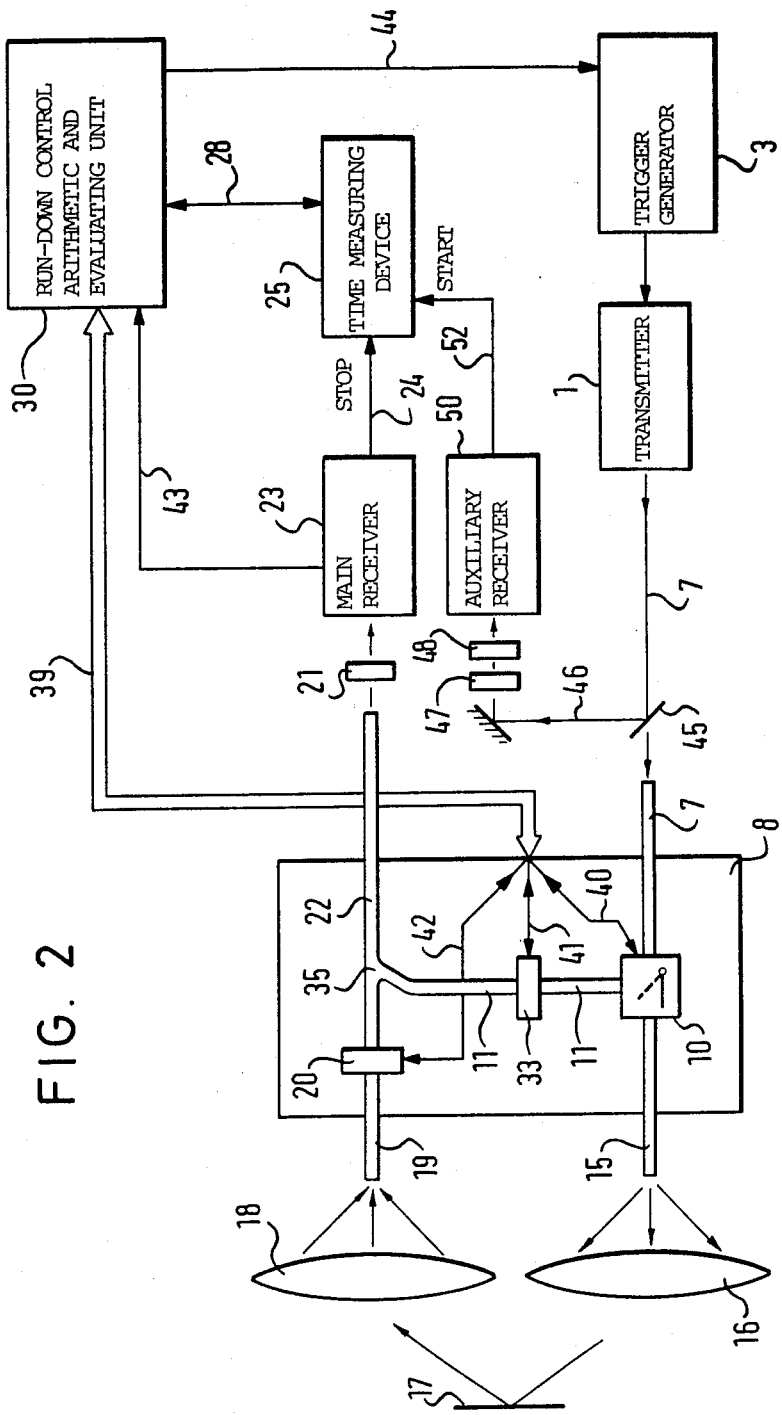

The embodiment of a distance measuring instrument according to the invention, represented in FIG. 2, corresponds in many parts, which are also all designated by the same reference numerals, with the embodiment shown in FIG. 1.

The most substantial difference is that, in the embodiment of FIG. 2, as transmitter 1 a Laser is used which on the one hand by reason of its substantially higher power permits the measurement of substantially greater distances (of more than 10 kilometers up to over 100 kilometers). On the other hand however the response delay of this Laser to the trigger signal, other than in the case of the Laser diode, can not be regarded as constant even over very short spaces of time. Rather, changes in the response time of up to several microseconds can occur from light pulse to light pulse even with very rapid light pulse sequence in such a Laser. Consequently somewhat different signal transit times must be established and measured, when one wants to attain a high measurement accuracy. For this purpose the output signal of the trigger generator 3 is no longer used as start signal for the time measuring device 25. Instead thereof in the transmitter light path 7 a beam splitter is provided which is formed by a partially permeable mirror 45, which is inclined at 45° to the optical axis of the transmitter light path 7 and which allows the greatest part, for example 99% of each light pulse emitted by the transmitter 1, to pass through rectilinearly to the optical switching and damping unit 8 and deflects only the remaining small part at an angle of 90° and feeds it into an auxiliary light path 46, which extends inside the instrument and which leads through a damping filter 47 and an interference filter 48 to an auxiliary receiver 50.

This auxiliary receiver 50 differs from the main receiver 23, which receives the reflected measurement light pulses or the reference light pulses, substantially in that it has no expensive avalanche diode as photoelectric transducer, but a substantially cheaper PIN diode which does not need a high voltage supply and the sensitivity of which, smaller by comparison with an avalanche diode, is fully sufficient, since a relatively great brightness stands at disposal through the auxiliary light path 46.

For the remainder, the auxiliary receiver 50 likewise contains amplifier and processing circuits which permit an output signal to be generated, which is correlated exactly in time with the arrival of a light pulse and which is conducted as start signal through line 52 to the time measuring device 25.

Preferably used as time measuring device 25 in this case is an arrangement, in which the precision measurement values for the start signals, here no longer correlated with the time base signal, are determined by a different analog measuring device than the precision measurement values for the stop signals. A time measuring arrangement, of that kind and making possible very exact measurement results, is for example disclosed in DE-OS No. 28 42 450.

Through the use of two separate analog measuring channels, the use of a short reference light path 11 as well as the measurement of distances as short as desired is made possible, since no time concurrence can occur between start signals and stop signals.

Although this embodiment of a distance measuring instrument according to the invention has in its optical part as well as in its time measuring device 25 two "channels" separated one from the other, namely the measurement route 7, 15, 17, 19 and 22 or the reference route 7, 11 and 22 on the one hand and the auxiliary light path 46 on the other hand as well as both the analog measuring devices for the formation of both the precision measurement values each belonging to a respective signal transit time measurement, its manner of function and accuracy of measurement is that of a single-channel arrangement.

In a genuine two-channel arrangement, as it is for example described in DE-OS No. 27 23 835, a reference light pulse part is branched off from each measurement light pulse and conducted to an individual receiver, the output signal of which serves for the start of a transit time measurement which is terminated by the output signal of another receiver which receives the measurement light pulse reflected by the target object. Since start signal and stop signal for the transit time measurement can follow one another very rapidly in the case of short measured distances, the required precision time measurement is each time performed with an individual analog measuring device. Only one single kind of light pulse transit time measurements takes place here, namely the transit time measurements for the measurement light pulses, and the respectively resulting measurement value contains, apart from the sought distance, also the difference of the reaction and signal processing times of both the channels; this difference is subject to temporal fluctuations and drift phenomena. For the elimination of this error source, the so-called zero deviation of both the channels is measured, i.e. the oscillatory circuits connected behind both the receiving photo-diodes are for example electrically triggered exactly at the same time, and the then resulting transit time difference is measured and subtracted from the previously obtained measurement light pulse transit time value. In that case, the strongly temperature-dependent response delays of the photo-diodes are however not detected.

According to the invention, however, two kinds of signal transit time measurements, namely measuring signal transit time measurements over the measurement route 7, 15, 17, 19 and 22 and reference signal transit time measurements over the reference route 7, 11 and 22 are performed ona after the other also in the second embodiment, wherein both the optical "channels" as well as also the two analog measuring circuits so come into use for each of these signal transit time measurements that all arising delay and signal processing times enter in like manner into the resulting signal transit time measurement values. Due to the fact that measurements follow one behind the other so rapidly that the just named "parasitic" times either do not change at all or at most linearly, they drop out completely in the subtracting and averaging operations performed for the determination of a single distance measurement value. This second embodiment thus represents a quasi single-channel system, in which particularly the reproducibility of the response behaviour of the transmitter plays no part and which in its function and accuracy of measurement largely corresponds to the pure single-channel system of the embodiment according to FIG. 1.

Figure 3:
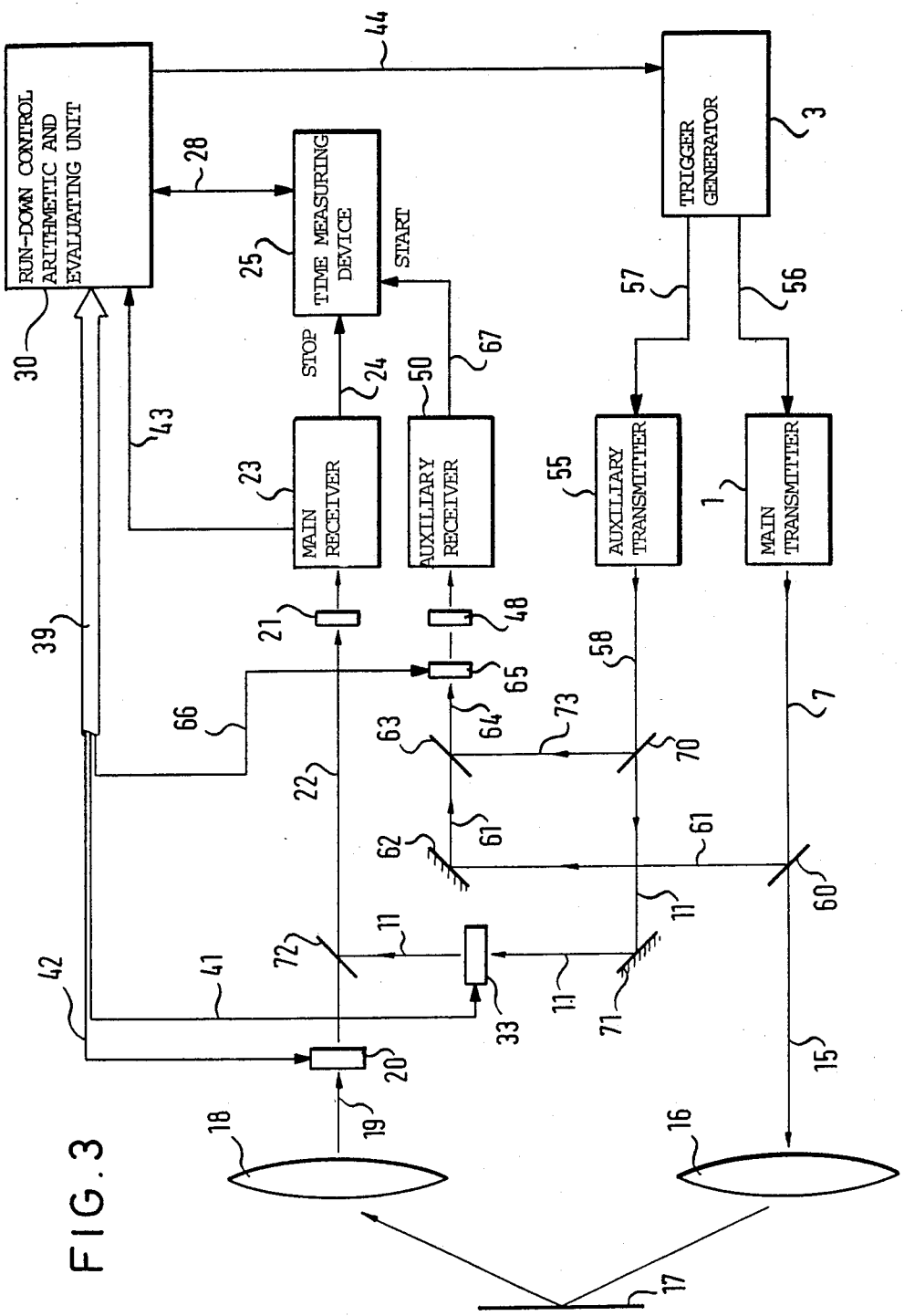

In a third embodiment illustrated in FIG. 3, the light paths are no longer illustrated as light fibre conductors, but are symbolized merely by a respective central ray. This embodiment comprises, apart from the main transmitter 1 serving for the generation of the measurement light pulses, an auxiliary transmitter 55, which can possess a substantially lower power, since it serves only for the generation of the reference light pulses. The trigger generator 3, according to command signals forwarded to it through the line 44, triggers both the transmitters 1 and 55 alternately through the lines 56 and 57, respectively, so that one time the main transmitter 1 generates a measurement light pulse which is forwarded via the measurement route 7, 15, 17, 19 and 22 to the main receiver 23 and one time the auxiliary transmitter 55 generates a reference light pulse which is forwarded via the reference route 58, 11 and 22 to the main receiver 23.

A correlation of the trigger signals with a time base signal of the time measuring device 25 does not take place and a Laser with strongly fluctuating response behaviour can be used particularly as main transmitter 1.

A signal transit time measurement over the measurement route 7, 15, 17, 19 and 22 takes place in the manner that the main transmitter 1 by reason of an appropriate trigger signal generates a measurement light pulse, the main part of which rectilinearly traverses a first beam splitter 60, for example a partially permeable mirror, arranged in the output light path 7 of the main transmitter 1 in order to be emitted towards the target object, while a small part of the measurement light pulse is fed by the first beam splitter 60 into a first auxiliary light path 61 and gets through a totally reflecting deflecting mirror 62, a partially permeable coupling-in mirror 63, a light path section 64, a controllable damping device 65 and an interference filter 48 to the auxiliary receiver 50.

The damping device 65 is so controlled by the rundown control, arithmetic and evaluating unit 30 through a line 66 that the amplitude or brightness of the light pulses getting to the auxiliary receiver 50 is always about equally great.

On reception of the part branched off from the measurement light pulse, the auxiliary receiver 50 generates an output signal which is conducted as start signal through the line 67 to the time measuring device 25 for the signal transit time measurement under discussion. This start signal is not correlated in any manner with the time base signal of the time measuring device 25. Therefore the time distance of this start signal from a subsequent defined pulse edge of the time base signal must be determined by means of an analog measuring circuit to obtain a first precision time measurement value, and beginning with said defined pulse edge a counting of the periods of the time base signal has to be started, in order to obtain a coarse measurement value.

This measuring signal transit time measurement over the measurement route 7, 15, 17, 19 and 22 is terminated by the output signal generated by the main receiver 23 and forwarded through line 24 to the time measuring device 25 when it receives the measurement light pulse coming back from the target object 17. Since this stop signal can follow very rapidly on the start signal in the case of short target distance, the time distance of the stop signal from a subsequent defined pulse edge of the time base signal is measured by means of a second analog measuring circuit contained in the time measuring device 25 in order to obtain a second precision measurement value for this signal transit time measurement.

Only the reaction times of both the receivers 23 and 50 as well as the difference of the signal processing times in both the analog measuring circuits of the time measuring device 25, but not the reaction time of the main transmitter 1, enter as parasitic time values into this measuring signal transit time measurement.

The same applies to each reference signal transit time measurement over the reference route 58, 11 and 22, for which a light pulse is emitted by the auxiliary transmitter 55, the main part of which rectilinearly traverses a second beam splitter 70 in order to be directed into the reference light path 11, which comprises a totally reflecting deflecting mirror 71 and a controllable damping device 33, and is united by means of a partially permeable coupling-in mirror 72 with the receiving light path 22 leading to the main receiver 23.

The smaller part, coupled out by the second beam splitter 70, of each reference light pulse is fed into a second auxiliary light path 73, which is united by means of the partially permeable couling-in mirror 63 with the light path section 64 leading to the auxiliary receiver 50. In this reference signal transit time measurement, too, the output signal of the auxiliary receiver 50 serves as start signal and the output signal of the main receiver as stop signal for the time measuring device 25, which again undertakes a three-part time measurement, providing two precision time measurement values and a coarse time measurement value, wherein, as already mentioned, the resulting total measurement value is independent of the reaction time of the auxiliary transmitter 55 and for the remainder contains the same parasitic magnitudes as the previously obtained total measurement value of the measuring signal transit time measurement over the measurement route. The parasitic magnitudes can be eliminated completely according to the invention by subtracting the reference signal transit time value from the measuring signal transit time value or by subtracting a mean value which is taken from several such reference signal transit time values from a mean value which is taken from several such measuring signal transit time values. In any case the condition has to be met that all the measurements are performed so rapidly one after the other that no changes in these parasitic time spans arise in the period of time concerned.

This condition is fulfilled particularly easily in this embodiment, since the use of two separate transmitters 1 and 55 and the omission of mechanically movable light path change-over switches permits a particularly high light pulse sequence frequency in the order of magnitude of 20 kiloHertz.

If one triggers the auxiliary transmitter 55 more frequently than the main transmitter 1, a largely periodic operation of the auxiliary receiver 50 and the main receiver 23 as well as of both the analog measuring circuits contained in the time measuring device 25 can be attained, which leads to the already mentioned substantial increase in the accuracy of measurement.

Figure 4:
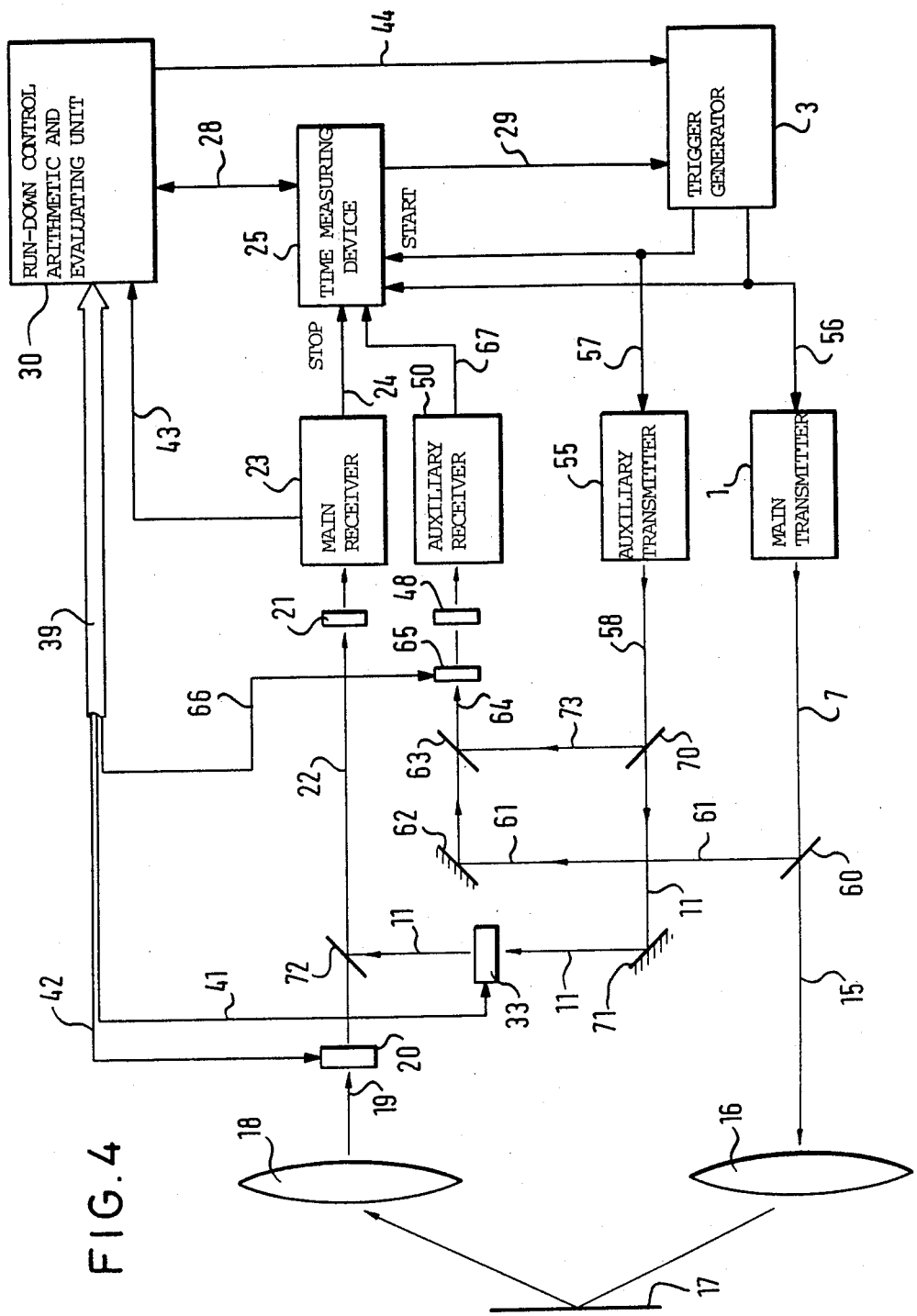

The embodiment illustrated in FIG. 4 is constructed almost identically with the variant according to FIG. 3. It differs from that mainly in its manner of operation, which is made possible through a different drive of the time measuring device 25.

Synchronising signals are hereagain delivered by the time measuring device 25 through the line 29 to the trigger generator 3, so that the trigger signals thereof are strictly synchronised with the time base signal. Since only Laser diodes with a response behaviour, which is well reproducible over the short term, come into use here as transmitters 1 and 55, the signal transit time measurements over the measurement route 7, 15, 17, 19 and 22 as well as also over the reference route 58, 11 and 22 can be started in dependence on the associated trigger signal solely with the coarse measurement value formation while dispensing with the first precision measurement value formation described above in conjunction with FIG. 3, which is symbolized in FIG. 4 by the trigger lines 56 and 57 being connected with the start input of the time measuring device 25.

The respective signal transit time measurement is then terminated by the output signal of the main receiver 23, wherein a precision measurement value formation again takes place here.

However, the reaction times of the main transmitter 1 and of the auxiliary transmitter 55 also enter into the thus obtained signal transit time values so that an elimination of all parasitic magnitudes is not completely possible through a simple subtraction of a reference signal transit time measurement value or a corresponding average value from a measuring signal transit time measurement value or a corresponding average value.

In order to attain this object, two further signal transit time measurements are performed here over both the auxiliary light paths 7, 61, 64 and 58, 73, 64. These first and second auxiliary signal transit time measurements are carried out as two-part time measurements just as was described above with respect to the measurement and the reference route. Amongst other things, the reaction times of the main transmitter 1 and of the auxiliary transmitter 55 again enter into the difference of both the auxiliary signal transit time measurements under discussion here so that all parasitic times can be eliminated by subtracting the difference of the auxiliary signal transit time measurement values from the difference between the measuring and the reference signal transit time measurement values.

In order to be able to decouple the signal transit time measurements over the measurement and reference routes from those over the first and second auxiliary light paths 61 and 63, respectively, controllable damping devices 20, 33 and 65 are used. When a signal transit time measurement is for example to take place over the measurement route 7, 15, 17, 19 and 22, then the first auxiliary light path 61, which is coupled through the static beam splitter 60 with the measurement route, is made ineffective thereby, that the damping device 65 is switched to minimum light permeability, while the controllable damping device 60 also serving for dynamic control can be used for blocking the measurement light path.

Instead of with the aid of the damping devices 20, 33 and 65, the same effect can also be obtained through an appropriate alternate blocking of the lines 24 and 67.

At least four two-part time measurements are thus performed in this variant for the formation of a distance measurement value, which though it reduces the measurement speed, however offers the advantage that the time measuring device need comprise only one single analog measuring circuit which moreover can be operated strictly periodically just as both the receivers 23 and 50.

Figure 5:
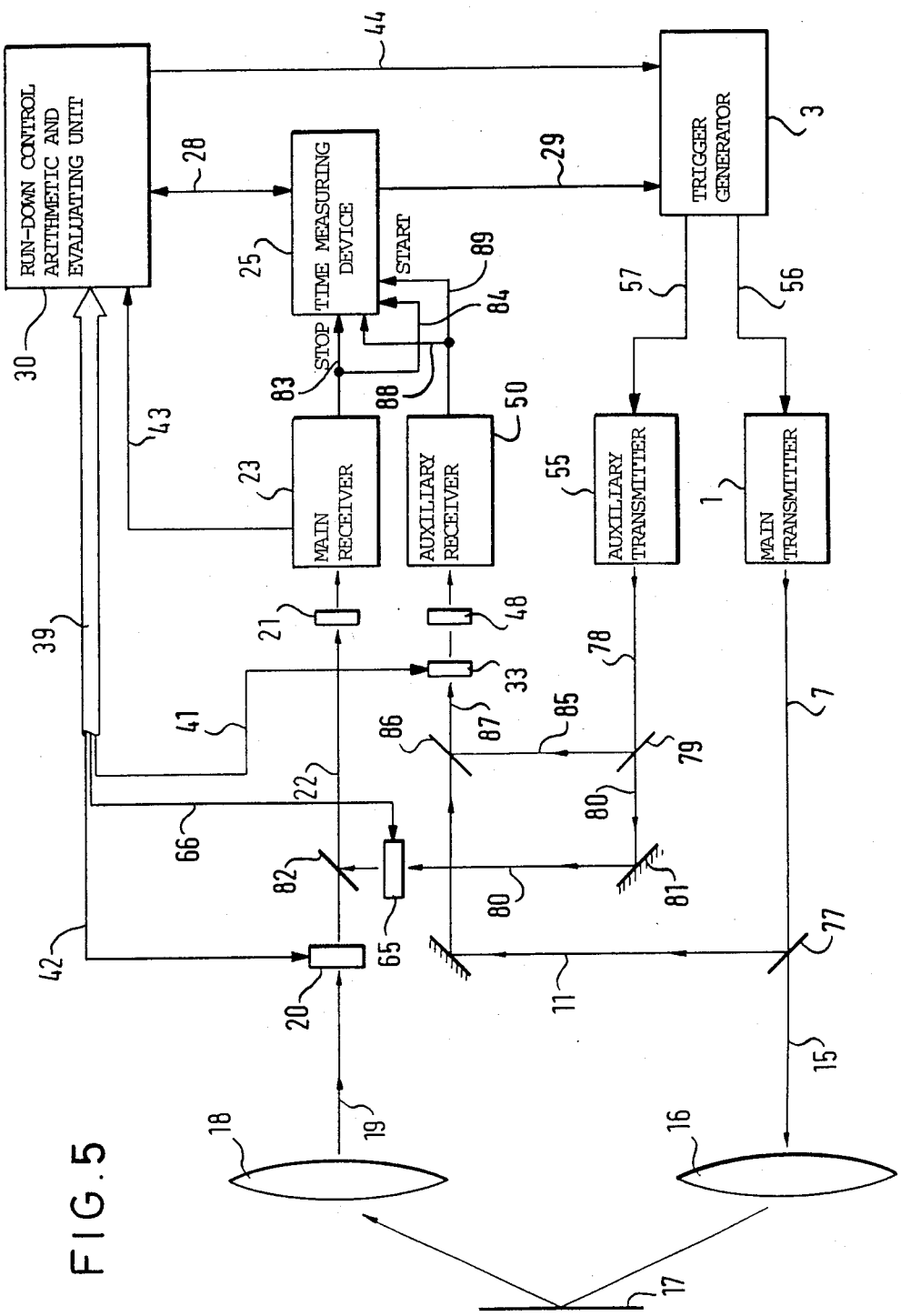

The embodiment illustrated in FIG. 5 differs from all preceding ones above all in that its reference light path 11, which is branched off from the measurement route 7, 15, 17, 19 and 22 with the aid of a beam splitter 77, ends not at the main receiver 23, but at the auxiliary receiver 50.

For the performance of a measuring signal transit time measurement over the measurement route 7, 15, 17, 19 and 22, a light pulse is generated in this embodiment at first by the auxiliary transmitter 55 in reaction on a trigger signal synchronised through the line 29 with the time base signal. The so generated light pulse is forwarded via transmitter light path 78 from the auxiliary transmitter 55 to a second beam splitter 79 which is traversed by the main part of this light pulse. This main part, for use as first auxiliary light pulse is directed into a first auxiliary light path 80 inside the instrument, comprising a totally reflecting deflecting mirror 81 and a controllable damping unit 65. By means of a partially permeable coupling-in mirror 82 the first auxiliary light pulse is further directed into the light path 22 leading to the main receiver 23. The output signal generated on the reception of this first auxiliary light pulse by the main receiver 23 is simultaneously conducted through the lines 83 and 84 to the start input and the stop input of the time measuring device 25; it is however suppressed by a not illustrated electronic switch behind the stop input of the time measuring device 25 so that it is used only as start signal.

Hereby, a three-part signal transit time measurement over the measurement route is initiated, i.e. the time distance of this start signal from a following defined pulse edge of the time base signal is determined by an analog circuit and, simultaneously with this pulse edge, a counting of the pulses of the time base signal is started.

The small part, coupled out by the beam splitter 79, of the light pulse generated by the auxiliary transmitter 55 is, for use as second auxilary light pulse, fed into a second auxiliary light path 85 inside the instrument and gets through a partially permeable coupling-in mirror 86 into the light path 87, which leads to the auxiliary receiver 50 and contains a controllable damping device 33. The output signal generated thereupon by the auxiliary receiver 50 is conducted through the lines 88 and 89 simultaneously to the stop input and to the start input of the time measuring device 25, however, in this case, remains ineffective, because the inputs are blocked by the above mentioned electronic switches. It is expressly pointed out here that the provision of a static beam splitter 79, in conjunction with the described operation of the electronic switches of the time measuring device 25, results in an operation corresponding to that of a light path change-over switch.

A defined number of periods of the time base signal after the above named trigger signal for the auxiliary transmitter 55, the trigger generator 3 generates a trigger signal, likewise synchronised with the time base signal, for the main transmitter 1, the light pulse of which gets through the transmitter light path 7 and is split into two parts by a partially permeable mirror 77. The main part of this light pulse is, for use as measuring light pulse, directed into the measurement route 15, 17, 19 and 22 and to the main receiver 23, the output signal of which becomes effective through the line 83 as stop signal for the time measuring device 25. The second precision time measurement now required can be performed even for very small distances by the same analog measuring circuit as the first precision time measurement since the time distance of both the trigger signals, which according to the invention is an integral multiple of a period of the time base signal, can be chosen to be sufficiently large.

Apart from this known time distance, only the response behaviour of both the transmitters 1 and 55 enter as parasitic magnitudes into the measuring signal transit time measurement over the measurement route, while the response behaviour of the mian receiver 23 as well as the signal processing time of the analog measuring circuit and the time measuring device 25 each enter twice with opposite sign and thus cancel each other out in the case of a sufficiently short time distance between start signal and stop signal.

The small part, coupled out by the beam splitter 77, of the light pulse generated by the main transmitter 1 is, for use as reference light pulse, fed into reference light path 11 and gets, after reflection by a totally reflecting deflection mirror toward auxiliary receiver 50, the corresponding output signal of which, however, at the just described measuring signal transit time measurement is suppressed by the above mentioned electronic switches of the time measuring device 25.

To eliminate the response delays of the two transmitters 1 and 55 a reference signal transit time measurement over the reference route is performed thereafter. For this purpose the auxiliary transmitter is at first again triggered correlated strictly with the time base signal. Of the light pulse emitted in that case, by an appropriate control of the electronic switch of the time measuring device 25, now however only that small part fed by the beam splitter 79 into the second auxiliary light path 85 becomes effective, which causes the auxiliary receiver 50 to generate a start signal through the line 89, while the line 88 is blocked.

A three-part reference signal transit time measurement starts, which is terminated by a light pulse, which is triggered later likewise after a defined number of periods of the time base signal and which gets from the main transmitter 1 through the transmitter light path 7, the beam splitter 77, the reference light path 11, the coupling-in mirror 86 and the light path 87 likewise to the auxiliary receiver 50 and causes this to generate a stop signal, while all other lines 89, 83 and 84 to the time measuring device 25 are blocked.

The thus obtained reference signal transit time value over the reference route 7, 11 and 87 again contains only the response behaviour of both the transmitters 1 and 55 as parasitic time magnitudes, while the response behaviour of the auxiliary receiver 50 and the signal processing time of the analog measuring circuit each again eliminate themselves.

The influence of the transmitters can also be eliminated by a subtraction of the reference signal transit time value from the measuring signal transit time value, when the above repeatedly named condition of a rapid measurement sequence is fulfilled.

The particular advantage of this variant is, as already mentioned, that the time measuring device need have only one single analog measuring circuit, thus genuinely operating single-channelled, which assures a particularly good accuracy of measurement.

We claim:

1. A method of measuring the distance of a target from a measuring appartus by determining the time of travel of individual unmodulated measuring light pulses of short duration to said target and therefrom, by reflection, back to the measuring apparatus, comprising the steps of:
   (a) providing an electro-optical transmitter means for generating individual unmodulated light pulses in response to trigger signals provided from a trigger generator,
   (b) generating for each individual unmodulated light pulse a start signal being related in time to the instant of generation of said light pulse,
   (c) providing means for using said individual unmodulated light pulses either as individual measuring light pulses by forwardly them along a first light path inside the apparatus toward an optical transmitting means transmitting them toward said target, or using them as individual reference light pulses by forwarding them inside that apparatus along a reference light path establishing a predetermined time of travel for said individual reference light pulses,
   (d) providing an electro-optical receiving means for receiving said individual measuring light pulses after reflection from said target as well as said individual reference light pulses, and for generating on receipt of each individual measuring light pulse and of each individual reference light pulse a respective stop signal,
   (e) generating at least one individual measuring light pulse and measuring a measuring signal transit time, i.e. the time distance between a start signal and a stop signal both signals corresponding to said measuring light pulse, said measuring signal transit time comprising three components, a first of which is the time span between the instant at which the measuring light pulse is generated and the instant at which the time distance measurement is actually started, a second of which is the time of travel of the measuring light pulse beginning with the instant at which said measuring light pulse is actually generated by said electro-optical transmitter means and ending with the instant at which, after reflection from the target, said measuring light pulse is received by said electro-optical receiving means, and a third of which is the time span between the instant at which said measuring light pulse is received by said electro-optical receiving means and the instant at which said time distance measurement is actually stopped, (f) generating at least one individual reference light pulse and measuring a reference signal transit time, i.e. the time distance between a start signal and a stop signal both signals corresponding to said reference light pulse, said reference signal transit time comprising three components, a first of which is the time span between the instant at which the reference light pulse is generated and the instant at which the time distance measurement is actually started, a second of which is the predetermined time of travel of the reference light pulse beginning with the instant at which said reference light pulse is actually generated by said electro-optical transmitter means and ending with the instant at which, after having travelled through said reference light path, said reference light pulse is received by said electro-optical receiving means, and a third of which is the time span between the instant at which said reference light pulse is received by said electro-optical receiving means and the instant at which said time distance measurement is actually stopped, (g) determining a measurement value difference which comprises the difference between the time of travel of said at least one measuring light pulse and the predetermined time of travel of said at least one reference light pulse and from which said first and said third components of said signal transit time measurement values are eliminated, and (h) adding to said measurement value difference said predetermined time of travel established by said reference light path and multiplying the result by the velocity of light in order to obtain one distance measurement value.

2. A method as claimed in claim 1,
wherein the step of providing an electro-optical transmitter means comprises providing one single transmitter for generating individual unmodulated light pulses in response to trigger signals from said trigger generator with a response time which, if at all, changes only slowly with respect to the repetition frequency of said trigger signals,
wherein the step of providing means for using said individual unmodulated light pulses either as individual measuring light pulses or as individual reference light pulses comprises providing a light path change-over switch being arranged in front of said single transmitter and being controllable to direct said individual unmodulated light pulses from said single transmitter either into said first light path for use as measuring light pulses or into said reference light path for use as reference light pulses,
wherein the step of generating for each individual unmodulated light pulse a start signal comprises using as start signal the respective trigger signal or any other signal electrically derived from said trigger signal and having a defined time relation thereto, and
wherein the step of providing an electro-optical receiving means comprises providing one single receiver which receives said reflected individual measuring light pulses as well as said individual reference light pulses and generates on each receipt of an individual light pulse a corresponding stop signal.

3. A method as claimed in claim 2,
wherein said step of generating for each individual unmodulated light pulse a start signal comprises
(a) using as start signal the corresponding trigger signal and
(b) delaying said trigger signal by a predetermined period of time before feeding it to said transmitter means.

4. A method as claimed in claim 1,
wherein the step of providing an electro-optical transmitter means comprises providing one single transmitter for generating individual unmodulated light pulses by responding to trigger signals from said trigger generator with a response time which may change from light pulse to light pulse,
wherein the step of providing means for using said individual unmodulated light pulses either as individual measuring light pulses or as individual reference light pulses comprises providing a light path change-over switch being arranged in front of said single transmitter and being controllable to direct said individual unmodulated light pulses from said single transmitter either into said first light path for use as measuring light pulses or into said reference light path for use as reference light pulses,
wherein the step of providing an electro-optical receiving means comprises providing a main receiver and an auxiliary receiver,
wherein the step of generating for each individual unmodulated light pulse a start signal comprises
(a) splitting each individual light pulse emitted by said transmitter into two parts, a first of which is directed toward said light path change-over switch for use either as individual measuring light pulse or as individual reference light pulse, and a second of which is directed via an auxiliary light patch inside said apparatus and establishing a predetermined time of travel, toward said auxiliary receiver, and
(b) using the output signal generated by said auxiliary receiver on receipt of each of said second parts of said individual unmodulated light pulses as start signal for the respective signal transit time measurement, each of the output signals generated by said main receiver on receipt of said first parts of said individual unmodulated light pulses being used as stop signal for the respective signal transit time measurement.

5. A method as claimed in claim 1,
wherein the step of providing an electro-optical transmitter means comprises providing a main transmitter and an auxiliary transmitter, each generating individual unmodulated light pulses in response to trigger signals provided from said trigger generator,
wherein the step of providing means for using individual unmodulated light pulses from said electro-optical transmitter means either as individual measuring light pulses or as individual reference light pulses comprises (a) arranging said first light path to receive all individual light pulses from said main transmitter for use as measuring light pulses,
(b) arranging said reference light path to receive all individual light pulses from said auxiliary transmitter for use as reference light pulses, and
(c) alternately providing trigger signals for said main transmitter and said auxiliary transmitter, wherein the step of providing an electro-optical receiving means comprises provided a main receiver and an auxiliary receiver, and wherein the step of generating for each individual unmodulated light pulse a start signal comprises
(a) splitting each individual light pulse emitted by said main transmitter into two parts, a first of which is directed into said first light path for use as individual measuring light pulse, and a second of which is directed via a first auxiliary light path, inside said apparatus and establishing a predetermined time of travel, toward said auxiliary receiver, and
(b) splitting each individual light pulse emitted by said auxiliary transmitter into two parts, a first of which is directed into said reference light path for use as individual reference light pulse, and a second of which is directed via a second auxiliary light path inside said apparatus and establishing a predetermined time of travel toward said auxiliary receiver, the output signals generated by said auxiliary receiver on receipt of each of said second measuring and reference light pulse parts being used as start signal for the respective signal transit time measurement and each of the output signals generated by said main receiver on receipt of each of said first measuring and reference light pulse parts being used as stop signal for the respective signal transit time measurement.

6. A method as claimed in claim 1,
wherein the step of providing an electro-optical transmitter means comprises providing a main transmitter and an auxiliary transmitter each generating individual unmodulated light pulses in response to trigger signals from said trigger generator,
wherein the step of generating for each individual unmodulated light pulse a start signal comprises using as start signal the respective trigger signal or any other signal electrically derived from said trigger signal and having a defined time relation thereto,
wherein the step of providing an electro-optical receiving means comprises providing a main receiver and an auxiliary receiver,
wherein the step of providing means for using individual unmodulated light pulses from said electro-optical transmitter means either as individual measuring light pulses or as individual reference light pulses comprises
(a) providing means for using individual unmodulted light pulses from said main transmitter either as individual measuring light pulses by forwarding them via said first light path, and, after reflection from said target, via said second light path, to said main receiver, or as first auxiliary light pulses by forwarding them via a first auxiliary light path inside said apparatus and establishing a predetermined time of travel for said first auxiliary light pulses to said auxiliary receiver,
(b) providing means for using individual unmodulated light pulses from said auxiliary transmitter either as reference light pulses by forwarding them via said reference light path to said main receiver, or as second auxiliary light pulses by forwarding them via a second auxiliary light path inside said apparatus and establishing a predetermined time of travel for said second auxiliary light pulses to said auxiliary receiver, wherein the step of generating at least one individual measuring light pulse comprises further generating at least one individual first auxiliary light pulse and measuring a first auxiliary signal transit time, i.e. the time distance between the respective start signal and the stop signal being generated by said auxiliary receiver on receipt of said at least one individual first auxiliary light pulse, said first auxiliary signal transit time comprising three components, a first of which is the time span between the instant at which said first auxiliary light pulse is generated and the instant at which said time distance measurement is actually started, a second of which is said predetermined time of travel of said first auxiliary light pulse beginning with the instant at which said first auxiliary light pulse is actually generated by said main transmitter and ending with the instant at which, after having travelled through said first auxiliary light path, said first auxiliary light pulse is received by said auxiliary receiver, and a third of which is the time span between the instant at which said first auxiliary light pulse is received by said auxiliary receiver and the instant at which said time distance measurement is actually stopped, wherein the step of generating at least one individual reference light pulse comprises further generating at least one individual second auxiliary light pulse and measuring a second auxiliary signal transit time, i.e. the time distance between the respective start signal and the stop signal being generated by said auxiliary receiver on receipt of said at least one individual second auxiliary light pulse, said second auxiliary signal transit time comprising three components, a first of which is the time span between the instant at which said second auxiliary light pulse is generated and the instant at which said time distance measurement is actually started, a second of which is said predetermined time of travel of said second auxiliary light pulse beginning with the instant at which said second auxiliary light pulse is actually generated by said auxiliary transmitter and sending with the instant at which, after having travelled through said second auxiliary light path, said second auxiliary light pulse is received by said auxiliary receiver, and a third of which is the time span between the instant at which said second auxiliary light pulse is received by said auxiliary receiver and the instant at which said time distance measurement is actually stopped, wherein the step of determining a measurement value difference comprises
(a) subtracting said at least one reference signal transit time measurement value from said at least one measuring signal transit time measurement value to obtain a first difference,
(b) subtracting said at least one second auxiliary transit time measurement value from said at least one first auxiliary transit time measurement value to obtain a second difference, and (c) subtracting said second from said first difference.

7. A method as claimed in claim 6,
wherein the step of providing means for using individual unmodulated light pulses from said main transmitter either as individual measuring light pulses or as individual first auxiliary light pulses comprises (a) splitting each individual light pulse emitted by said main transmitter into two parts, a first of which is directed into said first light path for use as individual measuring light pulse, and a second of which is directed into said first auxiliary light path for use as individual first auxiliary light pulse, and (b) alternately suppressing said first part before reaching said main receiver or said second part before reaching said auxiliary receiver, and, wherein the step of providing means for using individual unmodulated light pulses from said auxiliary transmitter either as individual reference light pulses or as individual second auxiliary light pulses comprises (a) splitting each individual light pulse emitted by said auxiliary transmitter into two parts, a first of which is directed into said reference light path for use as individual reference light pulse, and a second of which is directed into said second auxiliary light path for use as individual second auxiliary light pulse, and (b) alternately suppressing said first part before reaching said main receiver or said second part before reaching said auxiliary receiver.

8. A method as claimed in any of claims 2, 4, 5 or 6,
wherein the measurement of the time distance between a start signal and a stop signal corresponding to any of said individual unmodulated light pulses comprises (a) permanently providing a time base signal consisting of a sequence of pulse signals having a predetermined constant repetition frequency, said trigger signals being generated independently of said time base signal, (b) performing an analog measurement of the time distance between said start signal and a defined first subsequent pulse of said time base signal for obtaining a first precision time measurement value for each individual unmodulated light pulse, (c) performing an analog measurement of the time distance between said stop signal and a defined second subsequent pulse of said time base signal for obtaining a second precision time measurement value for each individual unmodulated light pulse, (d) counting the pulses of said time base signal occurring between said first and said second defined pulses and dividing the counted number by said predetermined repetition frequency for obtaining a coarse measurement value at least for each individual measuring light pulse, and (e) computing said time distance between said start signal and said stop signal by subtracting said second precision time measurement value from said first precision time measurement value, and, at least in the case of a time distance measurement for an individual measuring light pulse, by adding said coarse measurement value to said difference in order to obtain one signal transit time measurement value.

9. A method as claimed in claim 8,
wherein the measurement of the time distance between a start signal and a stop signal comprises obtaining said coarse measurement value for each individual unmodulated light pulse.

10. A method as claimed in any of claims 2, 4, 5 or 6,
wherein the measurement of the time distance between a start signal and a stop signal corresponding to any of said individual light pulses comprises (a) permanently providing a time base signal consisting of a sequence of pulse signals having a constant predetermined repetition frequency, each of said trigger signals being generated in synchronism with a pulse of said time base signal and being used as start signal, (b) performing an analog measurement of the time distance between said stop signal and a defined subsequent pulse of said time base signal for obtaining a precision time measurement value for each individual unmodulated light pulse, (c) counting the pulses of said time base signal occurring between said pulse, with which the respective trigger signal is in synchronism, and said defined subsequent pulse for obtaining a coarse time measurement value at least for each individual measuring light pulse, and (d) computing said time distance between said trigger signal, being used as start signal, and said stop signal by subtracting said precision time measurement value, at least in the case of a time distance measurement for an individual measuring light pulse, from said coarse measurement value to obtain one signal transit time measurement value.

11. A method as claimed in claim 10,
wherein the measurement of the time distance between a start signal and a stop signal comprises obtaining said coarse measurement value for each individual unmodulated light pulse.

12. A method as claimed in claim 1,
wherein the step of providing an electro-optical transmitter means comprises providing a main transmitter and an auxiliary transmitter each generating individual unmodulated light pulses in response to trigger signals provided from said trigger generator, wherein the step of providing an electro-optical receiving means comprises providing a main receiver and an auxiliary receiver, wherein the step of providing means for using individual unmodulated light pulses from said electro-optical transmitter means either as individual measuring light pulses or as individual reference light pulses comprises arranging said first light path and said reference light path to receive individual light pulses from said main transmitter and alternately forwarding these light pulses either as measuring light pulses toward said main receiver or as reference light pulses toward said auxiliary receiver, wherein the step of generating for each individual unmodulated light pulse a start signal comprises (a) arranging a first and a second auxiliary light path, each inside said apparatus and establishing a predetermined time of travel, to receive individual light pulses from said auxiliary transmitter, and alternately forwarding these light pulses either via said first auxiliary light path toward said main receiver for use as first auxiliary light pulses, or via said second auxiliary light path toward said auxiliary receiver for use as second auxiliary light pulses, (b) providing a first trigger signal for said auxiliary transmitter to generate an individual unmodulated light pulse and forwarding this light pulse as a first auxiliary light pulse via said first auxiliary light path toward said main receiver which, on receipt thereof, generates an output signal which is used as start signal for a measuring signal transit time measurement, (c) providing a first trigger signal for said main transmitter having a predetermined time distance from said first trigger signal for said auxiliary transmitter, forwarding the individual unmodulated light pulse which is generated by said main transmitter in reaction on said first trigger signal as individual measuring light pulse via said first light path, and, after reflection from said target, via said second light path toward said main receiver which, on receipt thereof, generates an output signal which is used as stop signal for said measuring signal transit time measurement, (d) providing a second trigger signal for said auxiliary transmitter to generate an individual unmodulated light pulse and forwarding this light pulse as a second auxiliary light pulse via said second auxiliary light path toward said auxiliary receiver which, on receipt thereof, generates an output signal which is used as start signal for a reference signal transit time measurement, (e) providing a second trigger signal for said main transmitter having a predetermined time distance from said second trigger signal for said auxiliary transmitter, forwarding the individual unmodulated light pulse which is generated by said main transmitter in reaction on said second trigger signal as individual reference light pulse via said reference light path toward said auxiliary receiver which, on receipt thereof, generates an output signal which is used as stop signal for said reference signal transit time measurement.

13. A method as claimed in claim 12, wherein providing said trigger signals for said main transmitter and said auxiliary transmitter comprises (a) providing a time base signal consisting of a sequence of pulse signals having a constant repetition frequency, and, (b) generating said trigger signals in synchronism with said time base signal in order to establish said predetermined time distances between said first trigger signals and said second trigger signals.

14. A method as claimed in claim 12, wherein the step of alternately forwaring said individual unmodulated light pulses which are generated by said main transmitter either as measuring light pulses toward said main receiver or as reference light pulses toward said auxiliary receiver comprises (a) splitting each individual light pulse emitted by said main transmitter into two parts, a first of which is directed into said first light path for use as individual measuring light pulse, and a second of which is directed into said reference light path for use as individual reference light pulse, and (b) alternately suppressing said first part before reaching said main receiver or said second part before reaching said auxiliary receiver, and wherein the step of alternately forwarding said individual unmodulated light pulses, which are generated by said auxiliary transmitter either as first or as second auxiliary light pulses toward said main or said auxiliary receiver comprises (a) splitting each individual light pulse emitted by said auxiliary transmitter into two parts, a first of which is directed into said first auxiliary light path for use as individual first auxiliary light pulse, and a second of which is directed into said second auxiliary light path for use as individual second auxiliary light pulse, and (b) alternately suppressing said first part before reaching said main receiver or said second part before reaching said auxiliary receiver.

15. A method as claimed in claim 13, wherein the step of measuring the time distance between a start signal and a stop signal, both corresponding to any of said individual measuring or reference light pulses comprises (a) performing an analog measurement of the time distance between said start signal and a defined first subsequent pulse of said time base signal for obtaining a first precision time measurement value for each individual unmodulated light pulse, (b) performing an analog measurement of the time distance between said stop signal and a defined second subsequent pulse of said time base signal for obtaining a second precision time measurement value for each individual unmodulated light pulse, (c) counting the pulses of said time base signal occurring between said first and said second defined pulses and dividing the counted number by said predetermined repetition frequency for obtaining a coarse measurement value, (d) computing said time distance between said start signal and said stop signal by subtracting said second precision time measurement value from said first precision time measurement value and by adding said coarse measurement value to said difference in order to obtain one signal transit time measurement value.

16. A method as claimed in claim 1, wherein at least one pair of individual unmodulated light pulses, a first of which is used as measuring light pulse and a second of which is used as reference light pulse, is generated within a period of time being so short that said first and third components of each signal transit time measurement value cannot change and, therefore, are the same for the obtained measuring signal transit time measurement value and the obtained reference signal transit time measurement value, and wherein the step of determining a measurement value difference comprises subtracting said obtained reference signal transit time measurement value from said obtained measuring signal transit time measurement value.

17. A method as claimed in claim 1, wherein several pairs of individual unmodulated light pulses are generated, one light pulse of each pair being used as measuring light pulse and one being used as reference light pulse each pair being generated within a period of time being so short that said first and third components of each signal transit time measurement value cannot change, and wherein the step of determining a measurement value difference comprises subtracting for each pair the respective reference signal transit time measurement value from the corresponding measuring signal transit time measurement value and of taking the average value of all such obtained differences.

18. A method as claimed in claim 1,
wherein at least three individual unmodulated light pulses, a first and a third of which are used as reference light pulses and a second of which is used as measuring light pulse, are generated within a period of time being so short that said first and third components of each signal transit time measurement value can change, if at all, only linearly, and
wherein the step of determining a measurement value difference comprises
(a) taking the average value of the reference signal transit time measurement values of said two reference light pulses, and
(b) subtracting said average value from said measuring signal transit time measurement value.

19. A method as claimed in claim 1,
wherein a series of individual unmodulated light pulses, which alternately are used as measuring light pulses and as reference light pulses, are generated within a period of time being so short that said first and third components of each signal transit time measurement value can change, if at all, only linearly, and
wherein the step of determining a measurement value difference comprises
(a) taking the average value of the reference signal transit time measurement values of all reference light pulses of said series,
(b) taking the average value of the measuring signal transit time measurement values of all measuring light pulses of said series, and
(c) subtracting said first, from said second average value.

20. A method as claimed in claim 19,
wherein said trigger generator is controlled to generate the trigger signals for the individual unmodulated light pulses of each of said series so that said individual light pulses periodically arrive at said electro-optical receiving means.

21. Distance measuring apparatus for determining the times of travel of individual unmodulated measuring light pulses to a target and therefrom, by reflection, back to the apparatus which for this purpose comprises:
a transmitter means having a main transmitter driven by trigger signals from a trigger generator for emitting individual unmodulated measuring light pulses of short duration, and an auxiliary transmitter driven by trigger signals from said trigger generator for emitting individual unmodulated reference light pulses,
a control means for controlling said trigger generator to alternately trigger said main transmitter and said auxiliary transmitter, for alternately generating measuring light pulses and reference light pulses,
an optical transmitting means for transmitting individual measuring light pulses toward said target,
an optical receiving means for receiving individual reflected unmodulated measuring light pulses from said target,
an electro-optical receiving means having a main receiver and an auxiliary receiver,
a first light beam splitter means which is arranged in front of said main transmitter for splitting each individual measuring light pulse from said main transmitter into two parts, a first of which is directed into a first light path and a second of which is directed into a first auxiliary light path, said first light path transmitting said first measuring light pulse parts to said optical transmitting means and said first auxiliary light path inside the apparatus establishing a predetermined time of travel for said second measuring light pulse parts and transmitting them to said auxiliary receiver,
a second light path from said optical receiving means to said electro-optical receiving means for supplying to said main receiver individual reflected first measuring light pulse parts,
a second light beam splitter means which is arranged in front of said auxiliary transmitter for splitting each individual reference light pulse from said auxiliary transmitter into two parts, a first of which is directed into a reference light path and a second of which is directed into a second auxiliary light path, said reference light path inside the apparatus establishing a predetermined time of travel for said first reference light pulse parts and transmitting them to said main receiver, and said second auxiliary light path inside the apparatus establishing a predetermined time of travel for said second reference light pulse parts and transmitting them to said auxiliary receiver,
a time measuring means for measuring signal transit times of individual measuring light pulses as well as of individual reference light pulses, the transit time of an individual measuring or reference light pulse being the time difference between a start signal generated by said auxiliary receiver on receipt of the respective second measuring light pulse part or of the respective second reference light pulse part, respectively, and a stop signal generated by said main receiver on receipt of the respective first reflected measuring light pulse part or of the respective first reference light pulse part, said time measuring means being operatively connected to said main and auxiliary receivers,
and a storage and computing means for storing obtained signal transit time measurement values, for determining a measurement value difference which comprises the difference between the time of travel of at least one measuring light pulse and the time of travel of at least one reference light pulse, and for adding to said measurement value difference said predetermined time of travel established by said reference light path and multiplying the result by the velocity of light in order to obtain one distance measurement value.

22. A distance measuring apparatus as claimed in claim 21, wherein said time measuring means comprises a time base means permanently gnerating a time base signal consisting of a sequence of pulse signals having a constant repetition frequency, said trigger signals being generated independently of said time base signal, and further comprises an analog time measuring means for measuring the time distance between any start signal and a defined first subsequent pulse of said time base signal for obtaining for each signal transit time measurement a first precision time measurement value, and for measuring the time distance between the corresponding stop signal and a defined second subsequent pulse of said time base signal for obtaining for each siganl transit time measurement a second precision time measurement value, storage means for storing said first and said second precision time measurement values, and a counter means for counting the pulses of said time base signal occurring between said first and said second defined pulses for obtaining at least for each measuring signal transit time measurement a coarse time measurement value, each of said second precision time measurement values being subtracted from the corresponding first precision time measurement value and, at least in the case of measuring light pulses, the respective coarse measurement value being added to the resulting difference in order to obtain a signal transit time measurement value.

23. A distance measuring apparatus as claimed in claim 22, wherein said coarse time measurement value is obtained and added to the difference of the corresponding precision time measurement values for each signal transit time measurement.

24. A distance measuring apparatus as claimed in claim 21, wherein said time measuring means comprises a time base means permanently generating a time base signal consisting of a sequence of pulse signals having a constant repetition frequency, each of said trigger signals being generated in synchronism with a pulse of said time base signal, and further comprises an analog time measuring means for measuring the time distance between any stop signal and a defined subsequent pulse of said time base signal for obtaining for each signal transit time measurement a precision time measurement value, and a counter means for counting the pulses of said time base signal occurring between said pulse, with which the respective trigger signal is in synchronism, and said defined subsequent pulse for obtaining a coarse time measurement value at least for each measuring signal transit time measurement, said coarse time measurement value being added to said precision time measurement value in order to obtain a measuring signal transit time measurement value.

25. A distance measuring apparatus as claimed in claim 24, wherein said coarse time measurement value is obtained and added to the respective precision time measurement value for each signal transit time measurement.

26. Distance measuring apparatus for determining the times of travel of individual unmodulated measuring light pulses to a target and therefrom, by reflection, back to the apparatus which for this purpose comprises:

a transmitter means having a main transmitter and an auxiliary transmitter both being driven by trigger signals from a trigger generator for alternately emitting individual unmodulated light pulses of short duration, a first light path and a first auxiliary light path extending inside said apparatus and being arranged to receive light pulses from said main transmitter, said first light path forwarding said received light pulses for use as measuring light pulses to an optical transmitting means transmitting them toward said target, and said first auxiliary light path forwarding said received light pulses for use as first auxiliary light pulses, a reference light path and a second auxiliary light path extending inside said apparatus and being arranged to receive light pulses from said auxiliary transmitter, said reference light path establishing a predetermined time of travel for said received light pulses and forwarding them for use as reference light pulses, and said second auxiliary light path forwarding said received light pulses for use as second auxiliary light pulses, an optical receiving means for receiving individual reflected unmodulated measuring light pulses from said target, an electro-optical receiving means having a main receiver receiving via a second light path said individual reflected measuring light pulses from said optical receiving means and also receiving via said reference light path said individual reference light pulses, and having an auxiliary receiver receiving via said first and said second auxiliary light paths, both establishing predetermined times of travel, said first and second auxiliary light pulses, a first controllable means for forwarding individual light pulses generated by said main transmitter either via said first light path, and, after reflection from said target, via said second light path to said main receiver or via said first auxiliary light path to said auxiliary receiver, a second controllable means for forwarding individual light pulses generated by said auxiliary transmitter either via said reference light path to said main receiver or via said second auxiliary light path to said auxiliary receiver;

a control means for controlling said trigger generator to trigger said main and said auxiliary transmitters to alternately generate individual light pulses and for controlling said first and second controllable means to alternately provide the so generated light pulses for use as measuring light pulses, first auxiliary light pulses, reference light pulses or second auxiliary light pulses, a time measuring means for alternately measuring signal transit times of individual measuring light pulses, of first auxiliary light pulses, of reference light pulses and of second auxiliary light pulses, the signal transit time of each of such light pulses being the time difference between a start signal, which is generated in response to the respective trigger signal from said trigger generator, and a stop signal which is generated either by said main receiver on receipt of the respective measuring light pulses or of the respective reference light pulse, or by said auxiliary receiver on receipt of the respective first auxiliary light pulse or of the respective second auxiliary light pulse, and a storage and computing means for storing obtained signal transit time measurement values, for determining differences between signal transit time measurement values of measuring light pulses and signal transit time measurement values of reference light pulses, for correcting these differences by subtracting therefrom differences between signal transit time measurement values of first auxiliary light pulses and signal transit time measurement values of second auxiliary light pulses, and for adding to the such obtained corrected measurement value differences said predetermined time of travel established by said reference light path and multiplying the result by the velocity of light in order to obtain one distance measurement value.

27. A distance measuring apparatus as claimed in claim 26, wherein in front of said main transmitter a first light beam splitter means is arranged for splitting each individual light pulse provided therefrom into two parts, a first of which is directed into said first light path for use as measuring light pulse and a second of which is directed into said first auxiliary light path for use as first auxiliary light pulse, wherein in front of said auxiliary transmitter a second light beam splitter means is arranged for splitting each individual light pulse provided therefrom into two parts, a first of which is directed into said reference light path for use as reference light pulse and a second of which is directed into said second auxiliary light path for use as second auxiliary light pulse, and wherein said first controllable means comprises a first variable attenuation means arranged in said second light path, and a second variable attenuation means arranged in said reference light path, and said second controllable means comprises a third variable attentuation means arranged in front of said auxiliary receiver for attentuating said first as well as said second auxiliary light pulses, all three variable attentuation means being controllable to either not or totally attenuate the respective light pulses.

28. A distance measuring apparatus as claimed in claim 26, wherein said time measuring means comprises a time base means permanently generating a time base signal consisting of a sequence of pulse signals having a constant repetition frequency, said trigger signals being generated independently of said time base signal, and further comprises an analog time measuring means for measuring the time distance between any start signal and a defined first subsequent pulse of said time base signal for obtaining for each signal transit time measurement a first precision time measurement value, and for measuring the time distance between the corresponding stop signal and a defined second subsequent pulse of said time base signal for obtaining for each signal transit time measurement a second precision time measurement value, storage means for storing said first and said second precision time measurement values, and a counter means for counting the pulses of said time base signal occurring between said first and said second defined pulses for obtaining at least for each measuring signal transit time measurement a coarse time measurement value, each of said second precision time measurement values being subtracted from the corresponding first precision time measurement value and, at least in the case of measuring light pulses, the respective coarse measurement value being added to the resulting difference in order to obtain a signal transit time measurement value.

29. A distance measuring apparatus as claimed in claim 28, wherein said coarse time measurement value is obtained and added to the difference of the corresponding precision time measurement values for each signal transit time measurement.

30. A distance measuring apparatus as claimed in claim 26, wherein said time measuring means comprises a time base means permanently generating a time base signal consisting of a sequence of pulse signals having a constant repetition frequency, each of said trigger signals being generated in synchronism with a pulse of said time base signal, and further comprises an analog time measuring means for measuring the time distance between any stop signal and a defined subsequent pulse of said time base signal for obtaining for each signal transit time measurement a precision time measurement value, and a counter means for counting the pulses of said time base signal occurring between said pulse, with which the respective trigger signal is in synchronism, and said defined subsequent pulse for obtaining a coarse time measurement value at least for each measuring signal transit time measurement, said coarse time measurement value being added to said precision time measurement value in order to obtain a measuring signal transit time measurement value.

31. A distance measuring apparatus as claimed in claim 30, wherein said coarse time measurement value is obtained and added to the respective precision time measurement value for each signal transit time measurement.

32. Distance measuring apparatus for determining the times of travel of individual unmodulated measuring light pulses to a target and therefrom, by reflection, back to the apparatus which for this purpose comprises:
   a transmitter means having a main transmitter and an auxiliary transmitter both being driven by trigger signals from a trigger generator for alternately emitting individual unmodulated light pulses of short duration,
   a first light path and a reference light path extending inside said apparatus, and being arranged to receive light pulses from said main transmitter, said first light path forwarding said received light pulses for use as measuring light pulses to an optical transmitting means transmitting them toward said target, and said reference light path establishing a predetermined time of travel for said reveived light pulses and forwarding them for use as reference light pulses,
   a first auxiliary light path and a second auxiliary light path both establishing predetermined times of travel and being arranged inside said apparatus to receive light pulses from said auxiliary transmitter for use as first auxiliary light pulses or as second auxiliary light pulses, respectively,
   an optical receiving means for receiving individual reflected unmodulated measuring light pulses from said target,
   an electro-optical receiving means having a main receiver receiving via a second light path said individual reflected measuring light pulses from said optical receiving means and also receiving via said first auxiliary light path said first auxiliary light pulses, and having an auxiliary receiver receiving via said reference light path said individual reference light pulses and also receiving via said second auxiliary light path said second auxiliary light pulses,
   a first controllable means for forwarding individual light pulses generated by said main transmitter either via said first light path, and, after reflection from said target, via said second light path to said main receiver or via said reference light path to said auxiliary receiver,
   a second controllable means for forwarding individual light pulses generated by said auxiliary transmitter either via said first auxiliary light path to said main receiver or via said second auxiliary light path to said auxiliary receiver,
   a time measuring means comprises a time base means permanently generating a time base signal consisting of a sequence of pulse signals having a constant repetition frequency,
   a control means for controlling said trigger generator to trigger in synchronism with said time base signal said main and said auxiliary transmitters to alternately generate individual light pulses, and for controlling said first and second controllable means to provide a first light pulse generated by said auxiliary transmitter for use as first auxiliary light pulse, to provide the next subsequent light pulse generated by said main transmitter for use as measuring light pulse, to provide a further light pulse generated by said auxiliary transmitter for use as second auxiliary light pulse and to provide the next subsequent light pulse generated by said main transmitter for use as reference light pulse, said main receiver being operatively connected to said time measuring means for forwarding to it, on receipt of any first auxiliary light pulse a start signal for beginning a measuring signal transit time measurement for a measuring light pulse the generation of which is triggered with a well defined delay with respect to the trigger signal for generating the corresponding first auxiliary light pulse, and for forwarding to it, on receipt of said measuring light pulse, a stop signal for terminating said measuring signal transit time measurement, said auxiliary receiver being operatively connected to said time measuring means for forwarding to it, on receipt of any second auxiliary light pulse a start signal for beginning a reference signal transit time measurement for a reference light pulse the generation of which is triggered with a well defined delay with respect to the trigger signal for generating the corresponding second auxiliary light pulse, and for forwarding to it, on receipt of said reference light pulse, a stop signal for terminating said reference signal transit time measurement, and a storage and computing means for storing obtained measuring and reference signal transit time measurement values, for determining a measurement value difference which comprises the difference between the time of travel or at least one measuring light pulse and the time of travel of at least one reference light pulse, and for adding to said measurement value difference said predetermined time of travel established by said reference light path and multiplying the result by the velocity of light in order to obtain one distance measurement value.

33. A distance measuring apparatus as claimed in claim 32, wherein in front of said main transmitter a first light beam splitter means is arranged for splitting each individual light pulse provided therefrom into two parts, a first of which is directed into said first light path for use as measuring light pulse and a second of which is directed into said reference light path for use as reference light pulse, wherein in front of said auxiliary transmitter a second light beam splitter means is arranged for splitting each individual light pulse provided therefrom into two parts, a first of which is directed into said first auxiliary light path for use as first auxiliary light pulse, and a second of which is directed into said second auxiliary light path for use as second auxiliary light pulse, and wherein said first controllable means comprise a first variable attenuation means arranged in said second light path and a second variable attenuation means arranged in a part of said reference light path which said reference light path has in common with said second auxiliary light path, and said second controllable means comprise a third variable attenuation means arranged in said first auxiliary light path, all three variable attenuation means being controllable to either not or totally attenuate the respective light pulses.

34. A distance measuring apparatus as claimed in claim 32, wherein said time measuring means further comprises an analog time measuring means for measuring the time distance between any start signal and a first defined subsequent pulse of said time base signal for obtaining for each signal transit time measurement a first precision time measurement value, and for measuring the time distance between the corresponding stop signal and a second defined subsequent pulse of said time base signal for obtaining for each signal transit time measurement a second precision time measurement value, storage means for storing said first and second precision time measurement values, and a counter means for counting the pulses of said time base signal occurring between said first and said second defined pulses for obtaining for each signal transit time measurement a coarse time measurement value.

35. Distance measuring apparatus for determining the times of travel of individual unmodulated measuring light pulses to a target and therefrom, by reflection, back to the apparatus which for this purpose comprises:

a transmitter means having one single transmitter which is triggerable by trigger signals from a trigger generator for emitting individual unmodulated light pulses of short duration, and which responds to said trigger signals with a response time, which, if at all, changes only slowly with respect to the repetition frequency of said trigger signals, a first light path from the transmitter means to an optical transmitting means for transmitting individual measuring light pulses toward said target, an optical receiving means for receiving individual reflected unmodulated measuring light pulses from said target, a second light path for supplying individual reflected measuring light pulses from said optical receiving means to an electro-optical receiving means comprising one single electro-optical receiver, a reference light path for supplying individual unmodulated reference light pulses from said transmitter means to said single electro-optical receiver and establishing a predetermined time of travel for the reference light pulses, a light path change-over switch being arranged in front of said single transmitter and being controllable by a control means to direct light pulses from said single transmitter either into said first light path for use as measuring light pulses or into said reference light path for use as reference light pulses, a time measuring means for measuring signal transit times of individual measuring light pulses as well as of individual reference light pulses, the transit time of an individual measuring or reference light pulse being the time difference between a start signal related to the trigger signal for the respective individual measuring or reference light pulse and a stop signal which is generated on receipt of the respective individual measuring or reference light pulse by said electro-optical receiving means to which said time measuring means are operatively connected, said time measuring means having a time base means permanently generating a time base signal consisting of a sequence of pulse signals having a constant repetition frequency, said trigger signals being generated independently of said time base signal, an anaog time measuring means for measuring the time distance between any start signal and a defined first subsequent pulse of said time base signal for obtaining for each signal transit time measurement a first precision time measurement value, and for measuring the time distance between the corresponding stop signal and a defined second subsequent pulse of said time base signal for obtaining for each signal transit time measurement a second precision time measurement value, storage means for storing said first and said second precision time measurement values, and a counter means for counting the pulses of said time base signal occuring between said first and said second defined pulses for obtaining at least for each measuring signal transit time measurement a coarse time measurement value, each of said second precision time measurement values being subtracted from the corresponding first precision time measurement value and, at least in the case of measuring light pulses, the respective coarse measurement value being added to the resulting difference in order to obtain a signal transit time measurement value, and said distance measuring apparatus further comprising a storage and computing means for storing obtained signal transit time measurement values, for determining a measurement value difference which comprises the difference between the time of travel of at least one measuring light pulse, and the time of travel of at least one reference light pulse, and for adding to said measurement value difference said predetermined time of travel established by said reference light path and multiplying the result by the velocity of light in order to obtain one distance measurement value.

36. A distance measuring apparatus as claimed in claim 35, wherein said trigger signals from said trigger generator are directly fed to said time measuring means for use as start signals and wherein said trigger signals from said trigger generator are fed to said transmitter via a delay means providing a predetermined time delay.

37. A distance measuring apparatus as claimed in claim 35, wherein said coarse time measurement value is obtained and added to the difference of the corresponding precision time measurement values for each signal transit time measurement.

38. Distance measuring apparatus for determining the times of travel of individual unmodulated measuring light pulses to a target and therefrom, by reflection, back to the apparatus which for this purpose comprises:

a transmitter means having one single transmitter which is triggerable by trigger signals from a trigger generator for emitting individual unmodulated light pulses of short duration, and which responds to said trigger signals with a response time, which, if at all, changes only slowly with respect to the repetition frequency of said trigger signals, a first light path from the transmitter means to an optical transmitting means for transmitting individual measuring light pulses toward said target, an optical receiving means for receiving individual reflected unmodulated measuring light pulses from said target, a second light path for supplying individual reflected measuring light pulses from said optical receiving means to an electro-optical receiving means comprising one single electro-optical receiver, a reference light path for supplying individual unmodulated reference light pulses from said transmitter means to said single electro-optical receiver and establishing a predetermined time of travel for the reference light pulses, a light path change-over switch being arranged in front of said single transmitter and being controllable by a control means to direct light pulses from said single transmitter either into said first light path for use as measuring light pulses or into said reference light path for use as reference light pulses, a time measuring means for measuring signal transit times of individual measuring light pulses as well as of individual reference light pulses, the transit time of an individual measuring or reference light pulse being the time difference between a start signal related to the trigger signal for the respective individual measuring or reference light pulse and a stop signal which is generated on receipt of the respective individual measuring or reference light pulse by said electro-optical receiving means to which said time measuring means are operatively connected, said time measuring means having a time base means permanently generating a time base signal consisting of a sequence of pulse signals having a constant repetition frequency, each of said trigger signals being generated in synchronism with a pulse of said time base signal, an analog time measuring means for measuring the time distance between any stop signal and a defined subsequent pulse of said time base signal for obtaining for each signal transit time measurement a precision time measurement value, and a counter means for counting the pulses of said time base signal occurring between said pulse, with which the respective trigger signal is in synchronism, and said defined subsequent pulse for obtaining a coarse time measurement value at least for each measuring signal transit time measurement, said coarse time measurement value being added to said precision time measurement value in order to obtain a measuring signal transit time measurement value, and said distance measuring apparatus further comprising a storage and computing means for storing obtained signal transit time measurement values, for determining a measurement value difference which comprises the difference between the time of travel of at least one measuring light pulse and the time of travel of at least one reference light pulse, and for adding to said measurement value difference said predetermined time of travel established by said reference light path and multiplying the result by the velocity of light in order to obtain one distance measurement value.

39. A distance measuring apparatus as claimed in claim 38, wherein said coarse time measurement value is obtained and added to the respective precision time measurement value for each signal transit time measurement.

40. Distance measuring apparatus for determining the times of travel of individual unmodulated measuring light pulses to a target and therefrom, by reflection, back to the apparatus which for this purpose comprises:

a transmitter means having one single transmitter which is triggerable by trigger signals from a trigger generator for emitting individual unmodulated light pulses of short duration, and which responds to said trigger signals with a response time which may change from light pulse to light pulse, a first light path from the transmitter means to an optical transmitting means for transmitting individual measuring light pulses toward said target, an optical receiving means for receiving individual reflected unmodulated measuring light pulses from said target, a second light path for supplying individual reflected measuring light pulses from said optical receiving means to a main receiver of an electro-optical receiving means, a reference light path for supplying individual unmodulated reference light pulses from said transmitter means to said main receiver of said electro-optical receiving means and establishing a predetermined time of travel for the reference light pulses, a light path change-over switch being arranged in front of said single transmitter and being controllable by a control means to direct light pulses from said single transmitter either into said first light path for use as measuring light pulses or into said reference light path for use as reference light pulses, a light beam splitter means which is arranged between said single transmitter and said light path change-over switch for splitting each individual light pulse from said single transmitter into two parts, a first of which is directed toward said light path change-over switch for use either as individual measuring light pulse or as individual reference light pulse and a second of which is directed into an auxiliary light path inside the apparatus, establishing a predetermined time of travel for said second light pulse parts and transmitting them to an auxiliary receiver of said electro-optical receiving means, a time measuring means for measuring signal transit times of individual measuring light pulses as well as of individual reference light pulses, the transit time of an individual measuring or reference light pulse being the time difference between a start signal which is generated by said auxiliary receiver on receipt of the respective second measuring or reference light pulse part, and a stop signal which is generated by said main receiver on receipt of the respective first measuring or reference light pulse art, said time measuring means having a time base means permanently generating a time base signal consisting of a sequence of pulse signals having a constant repetition frequency, said trigger signals being generated independently of said time base signal, an analog time measuring means for measuring the time distance between any start signal and a defined first subsequent pulse of said time base signal for obtaining for each signal transit time measurement a first precision time measurement value, and for measuring the time distance between the corresponding stop signal and a defined second subsequent pulse of said time base signal for obtaining for each signal transit time measurement a second precision time measurement value, a storage means for storing said first and said second precision time measurement values, and a counter means for counting the pulses of said time base signal occurring between said first and said second defined pulses for obtaining at least for each measuring signal transit time measurement a coarse time measurement value, each of said second precision time measurement values being subtracted from the corresponding first precision time measurement value and, at least in the case of measuring light pulses, the respective coarse measurement value being added to the resulting difference in order to obtain a signal transit time measurement value, and said distance measuring apparatus further comprising a storage and computing means for storing obtained signal transit time measurement values, for determining a measurement value difference which comprises the difference between the time of travel of at least one measuring light pulse and the time of travel of at least one reference light pulse, and for adding to said measurement value difference said predetermined time of travel established by said reference light path and multiplying the result by the velocity of light in order to obtain one distance measurement value.

41. A distance measuring apparatus as claimed in claim 40, wherein said coarse time measurement value is obtained and added to the difference of the corresponding precision time measurement values for each signal transit time measurement.

42. Distance measuring apparatus for determining the times of travel of individual unmodulated measuring light pulses to a target and therefrom, by reflection, back to the apparatus which for this purpose comprises:

a transmitter means having one single transmitter which is triggerable by trigger signals from a trigger generator for emitting individual unmodulated light pulses of short duration, and which responds to said trigger signals with a response time which may change from light pulse to light pulse, a first light path from the transmitter means to an optical transmitting means for transmitting individual measuring light pulses towards said target, an optical receiving means for receiving individual reflected unmodulated measuring light pulses from said target, a second light path for supplying individual reflected measuring light pulses from said optical receiving means to a main receiver of an electro-optical receiving means, a reference light path for supplying individual unmodulated reference light pulses from said transmitter means to said main receiver of said electro-optical receiving means and establishing a predetermined time of travel for the reference light pulses, a light path change-over switch being arranged in front of said single transmitter and being controllable by a control means to direct light pulses from said single transmitter either into said first light path for use as measuring light pulses or into said reference light path for use as reference light pulses, a light beam splitter means which is arranged between said single transmitter and said light path change-over switch for splitting each individual light pulse from said single transmitter into two parts, a first of which is directed toward said light path change-over switch for use either as individual measuring light pulse or as individual reference light pulse and a second of which is directed into an auxiliary light path inside the apparatus, establishing a predetermined time of travel for said second light pulse parts and transmitting them to an auxiliary receiver of said electro-optical receiving means, a time measuring means for measuring signal transit time of individual measuring light pulses as well as of individual reference light pulses, the transit time of an individual measuring or reference light pulse being the time difference between a start signal which is generated by said auxiliary receiver on receipt of the respective second measuring or reference light pulse part, and a stop signal which is generated by said main receiver on receipt of the respective first measuring or reference light pulse part, said time measuring means having a time base means permanently generating a time base signal consisting of a sequence of pulse signals having a constant repetition frequency, each of said trigger signals being generated in synchronism with a pulse of said time base signal, an analog time measuring means for measuring the time distance between any stop signal and a defined subsequent pulse of said time base signal for obtaining for each signal transit time measurement a precision time measurement value, and a counter means for counting the pulses of said time base signal occurring between said pulse, with which the respective trigger signal is in synchronism, and said defined subsequent pulse for obtaining a coarse time measurement value at least for each measuring signal transit time measurement, said coarse time measurement value being added to said precision time measurement value in order to obtain a measuring signal transit time measurement value, and said distance measuring apparatus further comprising a storage and computing means for storing obtained signal transit time measurement values, for determining a measurement value difference which comprises the difference between the time of travel of at least one measuring light pulse and the time of travel of at least one reference light pulse, and for adding to said measurement value difference said predetermined time of travel established by said reference light path and multiplying the result by the velocity of light in order to obtain one distance measurement value.

43. A distance measuring apparatus as claimed in claim 42, wherein said coarse time measurement value is obtained and added to the respective precision time measurement value for each signal transit time measurement.

* * * * *